US007391020B2

(12) United States Patent
Bousse et al.

(10) Patent No.: US 7,391,020 B2
(45) Date of Patent: Jun. 24, 2008

(54) ELECTROSPRAY APPARATUS WITH AN INTEGRATED ELECTRODE

(76) Inventors: Luc Bousse, 1050 Rilma La., Los Altos, CA (US) 94022; Mingqi Zhao, 1304 Payette Ct., San Jose, CA (US) 95129

( * ) Notice: Subject to any disclaimer, the term of this patent is extended or adjusted under 35 U.S.C. 154(b) by 0 days.

(21) Appl. No.: 11/556,671

(22) Filed: Nov. 3, 2006

(65) Prior Publication Data

US 2007/0057179 A1 Mar. 15, 2007

Related U.S. Application Data

(63) Continuation of application No. 11/031,963, filed on Jan. 6, 2005, now abandoned.

(60) Provisional application No. 60/612,136, filed on Sep. 21, 2004.

(51) Int. Cl.
*H01J 49/04* (2006.01)
*B01D 59/44* (2006.01)

(52) U.S. Cl. ........................ 250/288; 250/281; 250/285; 250/428; 422/100

(58) Field of Classification Search ....................... None
See application file for complete search history.

(56) References Cited

U.S. PATENT DOCUMENTS 4,443,319 A 4/1984 Chait et al.
4,483,885 A 11/1984 Chait et al.
4,908,112 A 3/1990 Pace
4,963,736 A 10/1990 Douglas et al.
5,115,131 A 5/1992 Jorgenson et al.
5,223,226 A 6/1993 Wittmer et al.

(Continued)

FOREIGN PATENT DOCUMENTS

EP 1336097 A 4/2002

(Continued)

OTHER PUBLICATIONS

Advanced Bioanalytical Services, Inc., "Advanced BioAnalytical Services, Inc. gains patent rights to Novel microfluidic handling system". <<http://www.advion.com/neulicensepress1.html>> . Downloaded on May 9, 2002, 2 pages.

(Continued)

*Primary Examiner*—Nikita Wells
(74) *Attorney, Agent, or Firm*—Wilson Sonsini Goodrich & Rosati

(57) ABSTRACT

The invention provides related apparatus and methods of making an integrated electrospray tip by depositing ionic and/or electronic conductor materials onto a planar substrate. The invention also features methods of forming an electrospray apparatus comprising coupling a first planar substrate to the surface of a second planar substrate, wherein a surface on at least one of the substrates includes one or more microfluidic channels and/or reservoirs which are at least partially or totally enclosed therebetween. The conductive regions of the apparatus do not intersect the microfluidic channels within other portions of the apparatus provided preferably. The invention further provides related apparatus and methods for manufacturing and using microfluidic devices with integrated electrodes for electrospray ionization. The electrospray apparatus in some embodiments may include an electronic conductor electrode or an ionic conductor electrode formed from a microfluidic channel containing a conductive material selected from a variety of solutions and gels.

6 Claims, 15 Drawing Sheets

U.S. PATENT DOCUMENTS 5,296,114 A 3/1994 Manz
5,306,910 A 4/1994 Jarrell et al.
RE034,757 E 10/1994 Smith et al.
5,358,618 A 10/1994 Ewing et al.
5,393,975 A 2/1995 Hait et al.
5,423,964 A 6/1995 Smith et al.
5,599,432 A 2/1997 Manz et al.
5,624,539 A 4/1997 Ewing et al.
5,705,813 A 1/1998 Apffel et al.
5,716,825 A 2/1998 Hancock et al.
5,788,166 A 8/1998 Valaskovic et al.
5,800,690 A 9/1998 Chow et al.
5,833,861 A 11/1998 Afeyan et al.
5,856,671 A 1/1999 Henion et al.
5,858,188 A 1/1999 Soane et al.
5,858,195 A 1/1999 Ramsey
5,866,345 A 2/1999 Wilding et al.
5,868,322 A 2/1999 Loucks et al.
5,872,010 A 2/1999 Karger et al.
5,885,470 A 3/1999 Parce et al.
5,914,184 A 6/1999 Morman
5,917,184 A 6/1999 Carson et al.
5,935,401 A 8/1999 Amigo
5,945,678 A 8/1999 Yanagisawa
5,958,202 A 9/1999 Regnier et al.
5,965,001 A 10/1999 Chow et al.
5,969,353 A 10/1999 Hsieh
5,993,633 A 11/1999 Smith et al.
5,994,696 A 11/1999 Tai et al.
6,001,229 A 12/1999 Ramsey
6,010,607 A 1/2000 Ramsey
6,010,608 A 1/2000 Ramsey
6,012,902 A 1/2000 Parce
6,033,546 A 3/2000 Ramsey
6,033,628 A 3/2000 Kaltenbach et al.
6,054,034 A 4/2000 Soane et al.
6,056,860 A 5/2000 Amigo et al.
6,068,749 A 5/2000 Karger et al.
6,086,243 A 7/2000 Paul et al.
6,110,343 A 8/2000 Ramsey et al.
6,123,798 A 9/2000 Gandhi et al.
6,136,212 A 10/2000 Mastrangelo et al.
6,139,734 A 10/2000 Settlage et al.
6,149,870 A 11/2000 Parce et al.
6,156,181 A 12/2000 Parce et al.
6,159,739 A 12/2000 Weigl et al.
6,176,962 B1 1/2001 Soane et al.
6,187,190 B1 2/2001 Smith et al.
6,231,737 B1 5/2001 Ramsey et al.
6,238,538 B1 5/2001 Parce et al.
6,240,790 B1 6/2001 Swedberg et al.
6,245,227 B1 6/2001 Moon et al.
6,277,641 B1 8/2001 Yager
6,280,589 B1 8/2001 Manz et al.
6,284,113 B1 9/2001 Bjornson et al.
6,284,115 B1 9/2001 Apffel
6,318,970 B1 11/2001 Backhouse
6,322,682 B1 11/2001 Arvidsson et al.
6,337,740 B1 1/2002 Parce
6,342,142 B1 1/2002 Ramsey
6,368,562 B1 4/2002 Yao
6,375,817 B1 4/2002 Taylor et al.
6,394,942 B2 5/2002 Moon et al.
6,409,900 B1 6/2002 Parce et al.
6,413,401 B1 7/2002 Chow et al.
6,416,642 B1 7/2002 Alajoki et al.
6,417,510 B2 7/2002 Moon et al.
6,423,198 B1 7/2002 Manz et al.
6,432,311 B2 8/2002 Moon et al.
6,444,461 B1 9/2002 Knapp et al.
6,450,047 B2 9/2002 Swedberg et al.
6,450,189 B1 9/2002 Ganan-Calvo
6,454,924 B2 9/2002 Jedrzejewski et al.
6,454,938 B2 9/2002 Moon et al.
6,459,080 B1 10/2002 Yin et al.
6,461,516 B2 10/2002 Moon et al.
6,462,337 B1 10/2002 Li et al.
6,464,866 B2 10/2002 Moon et al.
6,465,776 B1 10/2002 Moini et al.
6,475,363 B1 11/2002 Ramsey
6,475,441 B1 11/2002 Parce et al.
6,481,648 B1 11/2002 Zimmermann
6,491,804 B2 12/2002 Manz et al.
6,495,016 B1 12/2002 Nawracala
6,500,323 B1 12/2002 Chow et al.
6,514,399 B1 2/2003 Parce et al.
6,517,234 B1 2/2003 Kopf-Sill et al.
6,524,456 B1 2/2003 Ramsey et al.
6,541,768 B2 4/2003 Andrien et al.
6,555,067 B1 4/2003 Gandhi et al.
6,569,324 B1 5/2003 Moon et al.
6,576,896 B2 6/2003 Figeys et al.
6,596,988 B2 7/2003 Corso et al.
6,602,472 B1 8/2003 Zimmermann et al.
6,605,472 B1 8/2003 Skinner et al.
6,607,644 B1 8/2003 Apffel, Jr.
6,621,076 B1 9/2003 van de Goor et al.
6,627,076 B2 9/2003 Griffiths
6,627,882 B2 9/2003 Schultz et al.
6,632,655 B1 10/2003 Mehta et al.
6,653,625 B2 11/2003 Andersson et al.
6,670,607 B2 12/2003 Wood et al.
6,681,788 B2 1/2004 Parce et al.
6,695,009 B2 2/2004 Chien et al.
6,709,559 B2 3/2004 Sundberg et al.
6,733,645 B1 5/2004 Chow
6,744,046 B2 6/2004 Valaskovic et al.
6,803,568 B2 * 10/2004 Bousse et al. ............... 250/288
6,814,859 B2 11/2004 Koehler et al.
6,969,850 B2 11/2005 Staats
7,105,812 B2 * 9/2006 Zhao et al. .................. 250/288
2001/0037979 A1 11/2001 Moon et al.
2001/0041357 A1 11/2001 Fouillet et al.
2002/0036140 A1 3/2002 Manz et al.
2002/0041827 A1 4/2002 Yager et al.
2002/0079219 A1 6/2002 Zhao et al.
2002/0100714 A1 8/2002 Staats
2002/0110902 A1 8/2002 Prosser et al.
2002/0117517 A1 8/2002 Unger et al.
2002/0121487 A1 9/2002 Robotti et al.
2002/0122474 A1 9/2002 Zhao et al.
2002/0123153 A1 9/2002 Moon et al.
2002/0139931 A1 10/2002 Yin et al.
2002/0158195 A1 10/2002 Anderson et al.
2002/0170825 A1 11/2002 Lee et al.
2002/0182649 A1 12/2002 Weinberger et al.
2003/0000835 A1 1/2003 Witt et al.
2003/0013203 A1 1/2003 Jedrzejewski et al.
2003/0017609 A1 1/2003 Yin et al.
2003/0026740 A1 2/2003 Staats
2003/0029724 A1 2/2003 Derand et al.
2003/0047680 A1 3/2003 Figeys et al.
2003/0066959 A1 4/2003 Anderson et al.
2003/0073260 A1 4/2003 Corso
2003/0082080 A1 5/2003 Zimmermann et al.
2003/0089605 A1 5/2003 Timperman
2003/0089606 A1 5/2003 Parce et al.
2003/0106799 A1 6/2003 Covington et al.
2003/0111599 A1 6/2003 Staats
2003/0141392 A1 7/2003 Nilsson et al.
2003/0146757 A1 8/2003 Aguero et al.
2003/0148922 A1 8/2003 Knapp et al.
2003/0153007 A1 8/2003 Chen et al.
2003/0180965 A1 9/2003 Yobas et al.

| | | | | |
|---|---|---|---|---|
| 2003/0213918 | A1 | 11/2003 | Kameoka et al. | |
| 2003/0215855 | A1 | 11/2003 | Dubrow et al. | |
| 2003/0224531 | A1 | 12/2003 | Brennen et al. | |
| 2004/0053333 | A1 | 3/2004 | Hitt et al. | |
| 2004/0075050 | A1 | 4/2004 | Rossier et al. | |
| 2004/0084402 | A1 | 5/2004 | Ashmead et al. | |
| 2004/0096960 | A1 | 5/2004 | Burd Mehta et al. | |
| 2004/0113068 | A1 | 6/2004 | Bousse et al. | |
| 2004/0159783 | A1 | 8/2004 | Gavin et al. | |
| 2004/0206399 | A1 | 10/2004 | Heller et al. | |
| 2004/0229377 | A1 | 11/2004 | Chen et al. | |
| 2005/0000569 | A1* | 1/2005 | Bousse et al. | 137/375 |
| 2005/0047969 | A1 | 3/2005 | Zhao et al. | |
| 2005/0072915 | A1 | 4/2005 | Stults et al. | |
| 2005/0123688 | A1 | 6/2005 | Craighead et al. | |
| 2005/0178960 | A1 | 8/2005 | Kameoka et al. | |
| 2006/0022130 | A1 | 2/2006 | Bousse et al. | |
| 2006/0060769 | A1* | 3/2006 | Bousse et al. | 250/282 |
| 2007/0051824 | A1 | 3/2007 | Larsson et al. | |
| 2007/0057179 | A1 | 3/2007 | Bousse et al. | |

FOREIGN PATENT DOCUMENTS

| | | |
|---|---|---|
| GB | 2379554 | 3/2003 |
| WO | WO 91/11015 | 7/1991 |
| WO | WO 96/04547 | 2/1996 |
| WO | WO 96/36425 | 11/1996 |
| WO | WO 00/30167 | 5/2000 |
| WO | WO 00/41214 | 7/2000 |
| WO | WO 00/62039 | 10/2000 |
| WO | WO 01/26812 | 4/2001 |
| WO | WO 01/57263 | 8/2001 |
| WO | WO 01/94907 | 12/2001 |
| WO | WO 02/45865 | 6/2002 |
| WO | WO 02/47913 | 6/2002 |
| WO | WO 02/055990 | 7/2002 |
| WO | WO 02/080222 | 10/2002 |
| WO | WO 03/004160 | 1/2003 |
| WO | WO 03/019172 | 3/2003 |
| WO | WO 03/054488 | 7/2003 |
| WO | WO 2004/044574 | 5/2004 |
| WO | WO 2004/051697 | 6/2004 |
| WO | WO 2004/062801 | 7/2004 |
| WO | WO 2004/067162 | 8/2004 |
| WO | WO 2004/070051 | 8/2004 |

OTHER PUBLICATIONS

Advion Biosciences, "Automated Nanospray-Employing Advion's ESI chip and automated sample delivery robot". <<http://www.advion.com/advion__auxfiles/AutomatedNanospray/sld001.htm>>. Downloaded May 9, 2002, 13 pages.

Advion Biosciences, "Coming soon . . . the Advion NanoMate 100". <<http://www.advion.com>>. Downloaded May 9, 2002, 6 pages.

Applera Corp., "Applied Biosystems, northeastern UN and Professor Barry L. Karger, Ph.D. collaboration to research advance separation technology for proteomics". <<http://www.applera.com/press/prccorp111901a.html>>. Downloaded May 9, 2002, 3 pages.

Auriola, Seppo et al., "Enhancement of sample loadings for the analysis of oligosaccharides isolated from *Pseudomonas aeruginosa* using transient isotachophoresis-electrospay-mass spectrometry". Electrophoresis (1998), 19:2665-2676.

Balaguer, E. et al., "Comparison of sheathless and sheath flow electrospray interfaces for on line capillary electrophoresis mass spectrometry of therapeutic peptide hormones". Diagonal 647, 08028, (2004), Salzberg, Austria.

Banks, J. Fred, "Recent advances in capillary electrophoresis/electrospray/mass spectrometry". Electrophoresis (1997), 18:2255-2266.

Banks, Jr., J. Fred et al., "Detection of fast capillary electrophoresis peptide and protein separations using electrospray ionization with a time-of-flight mass spectrometer". Anal. Chem. (May. 1, 1996), 68(9):1480-1485.

Barnidge, David R. et al., "A design for low-flow sheathless electrospray emitters". Anal. Chem. (1999), 71:4115-4118.

Becker, Holger, et al., "Polymer microfluidic devices". Talanta (2002), 56:267-287.

Bings, Nicolas H., "Microfluidic devices connected to fuse-silica capillaries with minimal dead volume". Anal. Chem. (1999), 71:3292-3296.

Cao, Ping et al., "Analysis of peptides, proteins, protein digests, and whole human blood by capillary electrode sheathless interface". J Am Soc Mass Spectrometry (1998), 9:1081-1088.

Chan, Jason H., et al., "Microfabricated polymer devices for automated sample delivery of peptides for analysis by electrospray ionization tandem mass spectrometry". Anal. Chem. (1999), 71:4437-4444.

Chang, Yan Zin et al., "Sheathless capillary electrophoresis/electrospray mass spectrometry using a carbon-coated fused-silica capillary". Anal. Chem. (Feb. 1, 2000), 72(3):626-630.

Chen, Shu-Hui, et al., "A disposable poly(methylmethacrylate)-based microfluidic module for protein identification by nanoelectrospray ionization-tandem mass spectrometry". Electrophoresis (2001) 22:3972-3977.

Chen, Yet-Ran et al., "A low-flow CE/electrospray ionization MS interface for capillary zone electrophoresis, large-volume sample stacking, and micellar electrokinetic chromatography". Anal. Chem. (Feb. 1, 2003), 75(3):503-508.

Chien, Ring-Ling et al., "Sample stacking of an extremely large injection volume in high-performance capillary electrophoresis". Anal. Chem. (1992), 64:1046-1050.

Chiou, Chi-Han, et al., "Micro devices integrated with microchannels and electrospray nozzles using PDMS casting techniques". Sensors and Actuators (2002), B 4311:1-7.

Crisp-Computer retrieval of information on scientific projects [abstract], <<http://commons.clt.nlh.gov/crisp3/CRISP_LIB.getdoc?textkey=6388327&p__grant__num=5R01HG002033-03&p__query=&ticket=. . . >>. Downloaded May 9, 2002, 2 pages.

Czaplewski, David A., et al., "Nanofluidic Channels withi Elliptical Cross Sections", Applied Physics Letters, 83(23), (Dec. 8, 2003), 4836,4838.

Czaplewski, David A., et al., "Nanomechanical Oscillators Fabricated Using Polymeric Nonfiber Templates", Nano Letters, 4 (2004), 437-439.

Czaplewski, David A., et al., "Nonlithographic Approach to Nanostructure Fabrication Using a Scanned Electrospinning Source", Journal of Vacuum Science & Technology B: Microelectronics and Nanometer Structures, 21(6), (Nov. 2003), 2994-2997.

Deng, Yuzhong, et al., "Chip-based quantitative capillary electrophoresis/mass spectrometry determination of drugs in human plasma". Analytical Chemistry (Apr. 1, 2001), 73(7)1432-1439.

DIAGNOSWISS, Disposable nano-electrospays. <<http://www.diagnoswiss.com/products/disp__nano__electr.html>>. Downloaded May 9, 2002, 2 pages.

Ding, Jianmei et al., "Advances in CE/MS: recent developments in interfaces and applications". Analytical Chemistry News & Features (Jun. 1, 1999), 378A-385A.

Figeys, Daniel et al., "High sensitivity analysis of proteins and peptides by capillary electrophoresis-tandem mass spectrometry: recent developments in technology and applications". Electrophoresis, (1998), 19:885-892.

Figeys, Daniel et al., "Protein identification by solid phase microextraction-capillary zone electrophoresis-microelectrospray-tandem mass spectrometry". Nature Biotechnology (Nov. 1996), 14:1579-1583.

Figleys, Daniel, et al., "A microfabricated device for rapid protein identification by microelectrospray ion trap mass spectrometry". Anal. Chem. (1997) 69:3153-3160.

Figeys, Daniel, et al., "Nanoflow solvent gradient delivery from a microfabricated device for protein identification by electrospray ionization mass spectrometry". Anal. Chem. (1998) 70:3721-3727.

Foret, Frantisek et al., "Trace analysis of proteins by capillary zone electrophoresis with on-column transient isotachophoretic preconcentration". Electrophoresis (1993), 14:417-428.

Geracimos, A., "Outwitting Ovarian Cancer". Correlogic Systems, Inc., Press Release dated Apr. 16, 2002, 4 pages.

Geromanos, S., et al., "Injection adaptable Fine Ionization Source ('JaFIS') for Continuous Flow Nano-electrospray". Rapid Commun. Mass Spectrom (1998) 12:551-556.
Geromanos, S., et al., "Tuning of an electrospray ionization source for maximum peptide-ion transmission into a mass spectrometer". Anal. Chem. (2000) 72(4)777-790.
Gobry, Véronique, et al., "Microfabricated polymer injector for direct mass spectrometry coupling". Proteomics (2002), 2:405-412.
Guo, Xu et al., "Analysis of metallonthioneins by means of capillary electrophoresis coupled to electrospray mass spectrometry with sheathless interfacing" Rapid Commun. Mass Spectrom. (1999), 13:500-507.
Hayes, Roger N., et al., "Collision-induced dissociation". Methods in Enzymology (1990), 193:237-263.
Issaq, Haleem J., et al., "SELDI-TOF MS for diagnostic proteomics". Analytical Chemistry (Apr. 1, 2003) 149-155.
Janini, George M. et al., "A sheathless nanoflow electrospray interface for on-line capillary electrophoresis mass spectrometry". Anal. Chem. (2003), 75:1615-1619.
Jiang, Yun, et al., "Integrated plastic microfluidic devices with ESI-MS for drug screening and residue analysis". Anal. Chem. (2001) 73:2048-2053.
Johansson, I. Monika et al., "Capillary electrophoresis-atmospheric pressure ionization mass spectrometry for the characterization of peptides". Journal of chromatography (1991), 554:311-327.
Kaiser, Thorsten et al., "Capillary electrophoresis coupled to mass spectrometer for automated and robust polypeptide determination in body fluids for clinical use". Electrophoresis (2004), 25:2044-2055.
Kaiser, Thorsten et al., "Capillary electrophoresis coupled to mass spectrometry to establish polypeptide patterns in dialysis fluids". Journal of Chromatography A (2003) 1013;157-171.
Kameoka, Jun, et al., "A polymeric microfluidic chip for CE/MS determination of small molecules". Anal. Chem. (2001), 73:1935-1941.
Kameoka, Jun, et al., "An electrospray ionization source for integration with microfluidics". Analytical Chemistry (Nov. 15, 2002), 74:5897-5901.
Kameoka, Jun, et al., "A Scanning Tip Electrospinning Source for Deposition of Oriented", Nanotechnology, 14, (2003), 1124-1129.
Kameoka, Jun, et al., "An Arrow Shaped Silicon Tip for Polymeric Nanofiber Fabrication", Journal of Photopolymer Science and Technology, 16, (2003), 423-426.
Kameoka, Jun, et al., "Fabrication of Oriented Polymeric Nanofibers on Planar Surfaces by Electrospinning", Applied Physics Letters, 83(2), (Jul. 14, 2003), 371-373.
Kameoka, Jun, et al., "Polymeric Nanowire Architecture", Journal of Materials Chemistry, 14, (2004), 1503-1505.
Kelly, John F. et al., "Capillary zone electrophoresis-electrospray mass spectrometry at submicroliter flow rates: practical considerations and analytical performance". Anal. Chem. (1997), 69:51-60.
Kim, Jin-Sung, et al., "Microfabricated PDMS multichannel emitter for electrospray ionization mass spectrometry". J. Am. Soc. Mass. Spectrom (2001) 12:453-469.
Kim, Jin-Sung, et al., "Microfabrication of polydimethylsiloxane electrospray ionization emitters". Journal of Chromatography (2001), 924:137-145.
Kim, Jin-Sung, et al., "Miniaturized multichannel electrospray ionization emitters on poly(dimethylsiloxane) microfluidic devices)". Electrophoresis (2001), 22:3993-3999.
Kirby, Daniel P. et al., "A CE/ESI-MS interface for stable, low-flow operation". Anal. Chem. (1996), 68:4451-4457.
Koutny, Lance B., et al., "Microchip electrophoretic immunoassay for serum cortisol". Anal. Chem. (1996) 68:18-22.
Larsson, Marita et al., "Transient isotachophoresis for sensitivity enhancement in capillary electrophoresis-mass spectrometry for peptide analysis". Electrophoresis (2000), 21:2859-2865.
Lazar, Iulia M., et al., "Subattomole-sensitivity microchip nanelectropray source with time-of-light mass spectrometry detection". Anal. Chem. (1997) 71:3627-3631.
Lee, Edgar D. et al., "On-line capillary zone electrophoresis-ion spray tandem mass spectrometry for the determination of dynorphins". Journal of Chromatography (1988), 458:313-321.
Li, Jianjun, et al., "Application of microfluidic devices to proteomics research". Molecular & Cellular Proteomics (2002) 157-168.
Li, Jianjun, et al., "Rapid and sensitive separation of trace level protein digests using microfabricated devices coupled to a quadrupole-time-of-flight mass spectrometer". Electrophoresis (2000) 21:198-210.
Li, Jianjun, et al., "Separation and identification of peptides from gel-isolated membrane proteins using a microfabricated device for combined capillary electrophoresis/nanoelectrospray mass spectrometry". Anal. Chem. (2000) 72:599-609.
Lin, Yuehe, et al., "Microfluidic devices on polymer substrates for bioanalytical applications". Pacific Northwest National Laboratory (1999), Richland, WA, USA, 10 pages.
Lion, Niels et al., "Flow-rate characterization of microfabricated polymer microspray emitters". Rapid Communications in Mass Spectrometry (2004), 18:1614-1620.
Liu, Haiqing, et al., "Polymeric Nanowire Chemical Sensor", Nano Letters, 4, (2004), 671-675.
Liu, Hanghui, et al., "Development of multichannel devices with an array of electrospray tips for high-throughput mass spectrmetry". Anal. Chem. (2000) 72:3303-3310.
Moini, Mehdi, "Design and performance of a universal sheathless capillary electrophoresis to mass spectrometry interface using a split-flow technique". Anal. Chem. (2001), 73:3497-3501.
Neuhoff, Nils V., et al., "Mass spectrometry for the detection of differentially expressed proteins: a comparison of surface-enhanced laser desorption/ionization and capillary electrophoresis/mass spectrometry". Rapid Comm. In Mass Spectrometry (2004), 18:149-156.
Neusub, Christian et al., "A robust approach for the analysis of peptides in the low femtomole range by capillary electrophoresis-tandem mass spectrometry". Electrophoresis (2002), 23:3149-3159.
Nilsson, Stefan et al., "A Simple and robust conductive graphite coating for sheathless electrospray emitters used in capillary electrophoresis/mass spectrometry". Rapid Communications in Mass Spectrometry (2001), 15:1997-2000.
Oleschuk, Richard D., et al., "Analytical microdevices for mass spectrometry". Trends in Analytical Chemistry (2000) 19(6):379-388.
Olivares, Jose A. et al., "On-line mass spectrometric detection for capillary zone electrophoresis". Anal. Chem. (1987), 59:1230-1232.
Paroni, Rita et al., "Creatinine determination in serum by capillary electrophoresis", Electrophoresis (2004), 25:463-498.
Premstaller, Andreas, et al., "High-Performance liquid chromatography-electrospray ionization mass spectrometry using monolithic capillary columns for proteomic studies". Anal. Chem. (2001) 73:2390-2396.
Ramsey, R.S., et al. "Generating electrospray from microchip devices using electroosmotic pumping". Analytical Chemistry (Mar. 15, 1997), 69(6)1174-1178.
Rocklin, Roy D. et al., "A microfabricated fluidic device for performing two-dimensional liquid-phase separations". Anal. Chem. (2000) 72:5244-5249.
Rohde, E. et al., "Comparison of protein mixtures in aqueous humor by membrane preconcentration-capillary electrophoresis-mass spectrometry". Electrophoresis (1998), 19:2361-2370.
Rohner, Tatiana, et al., "polymer microspray with an integrated thick-Film microelectrode". Analytical Chemistry (Nov. 15, 2001), 73(22)5353-5357.
Rossier, Joel S. et al., "Thin-chip microspray system for high-performance fourier-transform ion-cyclotron resonance mass spectrometry of biopolymers". Agew. Chem. Inst. Ed. (2003), 42:53-58.
Sanz-Nebot, Victoria et al., "Capillary electrophoresis coupled to time of flight-mass spectrometry of therapeutic peptide hormones". Electrophoresis (2003), 24:883-891.
Sassi, Alexander P., et al., "An automated, sheathless capillary electrophoresis-mass spectrometry platform for discovery of biomarkers in human serum". Electrophoresis (2005),26: pages unknown.
Schmitt-Kopplin, Philippe, et al., "Capillary electrophoresis-mass spectrometry: 15 years of developments and applications". Electrophoresis (2003), 3837-3867.
Schultz, Gary A., et al., "A fully integrated monolithic microchip electrospray device for mass spectrometry". Anal. Chem. (2000) 72:4058-4063.

Selby, David S., et al., "Direct quantification of alkaloid mixtures by electrospray ionixation mass spectrometry". Journal of Mass Spectrometry (1998) 33:1232-1236.
Smith, Richard D., et al., "Capillary zone electrophoresis-mass spectrometry using an electrospray ionization interface". Anal. Chem. (1998), 60:436-441.
Smith, Richard D. et al., "New developments in biochemical mass spectrometry : electrospray ionization". Anal. Chem. (1990), 62:882-899.
Sprinivasan, Tharas, "ESI and/or CE on microfluidic chips". Literature review (Sep. 18, 2002) 14 pages.
Stroink, Thom et al., "On-line coupling of size exclusion and capillary zone electrophoresis via a reversed-phased C18 trapping column for the analysis of structurally related enkephalines in cerebrospinal fluid". Electrophoresis (2003), 24:897-903.
Svedberg, Malin, et al., "Sheathless electrospray from polymer microchips". Anal. Chem. (2003) 75:3934-3940.
Tang, Keqi, et al., "Generation of multiple electrosprays using microfabricated emitter arrays for improved mass spectrometric sensitivity". Anal. Chem. 2001 73:1658-1663.
Tang, Ning, et al., "Current developments in SELDI affinity technology". Mass Spectrometry Reviews (2004), 23:34-44.
Tempels, F.W. Alexander et al., "Chromatographic preconcentration coupled to capillary electrophoresis via an in-line injection valve". Anal. Chem. (2004), 76:4432-4436.
Tomlinson, Andy J. et al., "Utility of Membrane Preconcentration-Capillary Electrophoresis-Mass Spectrometry in Overcoming Limited Sample Loading for Analysis of Biologically Derived Drug Metabolites, Peptides, and Proteins". J Am Soc Mass Spectrom (1997), 8:15-24.
Tomlinson, Andy J. et al., "Systematic development of on-line membrane preconcentration-capillary electrophoresis-mass spectrometry for the analysis of peptide mixtures". Journal of Capillary Electrophoresis (Sep./Oct. 1995), 2(5): 225-233.
Tomlinson, Andy J., et al., "Investigation of drug metabolism using capillary electrophoresis with photodiode array detection and on-line mass spectrometry equipped with an arraydetector". Electrophoresis (1994), 13:62-71.
Valaskovic, Gary A. et al., "Automated orthogonal control system for electrospray ionization mass spectrometry". ASMS Conference on Mass Spectrometry and Allied Topics held on May 23-27, 2004, New Objective, Inc. (2004):1-5, Nashville, TN.
Valaskovic, Gary A. et al., "Automated orthogonal control system for electrospray ionization". J Am Soc for Mass Spectrom (2004): 15:1201-1215.
Villanueva, Josep et al., "Serum peptide profiling by magnetic particle-assisted, automated sample processing and MALDI-TOF mass spectrometry". Anal. Chem. (Mar. 15, 2004), 76(6):1560-1570.
Von Brocke, Alexander et al., "Recent advances in capillary electrophoresis/electrospray-mass spectrometry". Electrophoresis (2001), 22:1251-1266.
Wachs, Timothy, et al., "Electrospray device for coupling microscale separations and other miniaturized devices with electrospray mass spectrometry". Anal. Chem. (2001) 73:632-638.
Wang, Michael Z., et al., "Analysis of human serum proteins by liquid phase isoelectric focusing and matrix-assisted laser desorption/ionization-mass spectrometry". Proteomics (2003), 3:1661-1666.
Wen, Jenny, et al, "Microfabricated isoelectric focusing device for direct electrospray ionization-mass spectrometry". Electrophoresis (2000) 21:191-197.
Wetterhall, Magnus et al., "A conductive polymeric material used for nanospray needle and low-flow sheathless electrospray ionization applications", Anal. Chem. (2002), 74:239-245.
Whitt, Jacob T. et al., "Capillary electrophoresis to mass spectrometry interface using a porous junction". Anal. Chem. (May 1, 2003), 75(9):2188-2191.
Wittke, Stefan et al., "Determination of peptides and proteins in human urine with capillary electrophoresis-mass spectrometry, a suitable tool for the establishment of new diagnostic markers". Journal of Chromatography A (2003), 1013:173-181.
Wright, G.L. et al., "Proteinchip surface enhanced laser desorption/ionization (SELDI) mass spectrometry: a novel protein biochip technology for detection of prostate cancer biomarkers in complex protein mixtures". Prostate Cancer and Prostatic Diseases (1999) 2:264-276.
Xue, Qifeng, et al., "Multichannel microchip electrospray mass spectrometry". Analytical Chemistry (Feb. 1, 1997), 69(3)426-430.
Yarin, A.L. et al., "Taylor cone and jetting from liquid droplets in electrospinning of nanofibers", Journal of Applied Physics (2001), 90:4836-4846.
Yuan, Cheng-Hui, et al., "Sequential Electrospray Analysis Using Sharp-Tip Channels Fabricated on a Plastic Chip", Anal. Chem., 73, (2001), 1080-1083.
Zhang, et al., "Microfabricated devices for capillary electrophoresis-electrospray mass spectrometry". Anal. Chem. (Aug. 1, 1999), 71(5)3258-3264.
Zhang, et al., "A microdevice with integrated liquid junction for facile peptide and protein analysis by capillary electrophoresis/electrospray mass spectrometry". Anal. Chem. (2000) 72:1015-1022.
Zhu, Xiaofeng et al., "A colloidal graphite-coated emitter for sheathless capillary electrophoresis/nanoelectrospray ionization mass spectrometry". Anal. chem. (2002), 74:5405-5409.

* cited by examiner

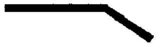
FIG. 6A
FIG. 6B
FIG. 6C
FIG. 6D
FIG. 6E
FIG. 6F
FIG. 6G
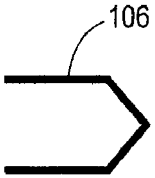
FIG. 6H
FIG. 6I
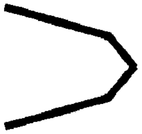
FIG. 6J
FIG. 6K
FIG. 6L
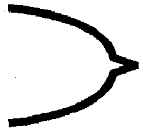
FIG. 6M
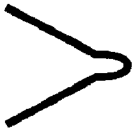
FIG. 6N
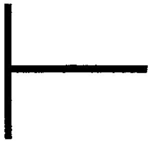
FIG. 6O
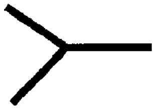
FIG. 6P
FIG. 6Q

ELECTROSPRAY APPARATUS WITH AN INTEGRATED ELECTRODE

This application is a continuation of U.S. Non-Provisional patent application Ser. No. 11/031,963 filed on Jan. 6, 2005, now abandoned which claims the benefit of Provisional Patent Application Ser. No. 60/612,136 filed on Sep. 21, 2004, which are incorporated by reference herein in their entirety.

BACKGROUND OF INVENTION

Interest in analyzing small samples of biomolecules has increased the demand for microfluidic systems providing sensitive through-put analysis. Electrospray tips have proven to be a useful component in certain microfluidic analytical systems. For example, see Bousse et al., U.S. Pat. No. 6,803,568 (application Ser. No. 10/649,350), "Multi-channel Microfluidic Chip for Electrospray Ionization," providing a high performance electrospray ionization device for mass spectrometry applications, and Stults et al., application Ser. No. 10/681,742, "Methods and Apparatus for Self-Optimization of Electrospray Ionization Devices," which are incorporated herein by reference.

In light of the burgeoning fields of proteomics, genomics and pharmacogenetics, and their diagnostic applications, there is a need for microfluidic analysis systems with durable, low-cost, easily-manufacturable, and readily-reproducible components, including electrospray tips. Thus, there remains a need for even more improved electrospray tips, along with improved methods of making them.

SUMMARY OF THE INVENTION

The present invention provides a method of making an electrospray apparatus with a tip, by first providing a first planar substrate having a conductive contact, and then incorporating the first planar substrate into the electrospray apparatus as the tip. That is, the invention provides a method of making an electrospray apparatus with a tip by first depositing a conductive contact onto a first planar substrate, and then incorporating the first planar substrate into the electrospray apparatus as the tip.

The present invention also provides a method of making a conductive contact for an electrospray apparatus with a tip, by first depositing a conductive material onto a first planar substrate, and then using the first planar substrate to make the tip of the electrospray apparatus.

A further aspect of the invention provides an electrospray tip including a first planar substrate having a conductive contact, where the first planar substrate attaches as the tip to a microfluidic device. In certain embodiments, the invention provides a first planar substrate having a conductive contact, where the first planar substrate incorporates into an electrospray apparatus as an electrospray tip. The present invention also features a layer or trace of conductive material deposited on a first planar substrate, where the first planar substrate incorporates into an electrospray apparatus as an electrospray tip. In some of these embodiments, the layer of conductive material lies between a first planar substrate and a second planar substrate at the electrospray tip.

The present invention also provides a method of making an electrospray tip including a first planar substrate having a conductive contact and an ionic conductor electrode. The ionic conductor acts like an electrode that is electrically connected to the conductive contact, preferably at a position removed from the electrospray tip. In certain embodiments, the invention provides a first planar substrate having a conductive contact and an ionic conductor electrode, where the first planar substrate incorporates into an electrospray apparatus as an electrospray tip.

A further aspect of the invention provides an electrospray tip including a first planar substrate having an electrode formed with an ionic conductor but no conductive contact. In certain embodiments, the invention provides a first planar substrate having an ionic conductor electrode, where the first planar substrate incorporates into an electrospray apparatus as an electrospray tip.

Other goals, advantages, and salient features of the invention will become apparent from the following detailed description and accompanying figures. While the following description may contain specific details describing particular embodiments of the invention, these should not be construed as limitations on the scope of the invention in any way. Rather, these serve to exemplify certain embodiments of the invention. For each aspect of the invention, many variations are possible as suggested herein and as known to those of ordinary skill in the art. Indeed, a variety of changes and modifications can be made within the scope of the invention without departing from the spirit of the present invention.

BRIEF DESCRIPTION OF THE FIGURES

FIG. 6 shows a number of patterns of conductive material deposited on a substrate as integrated electrodes for electrospray tips.

DETAILED DESCRIPTION OF THE INVENTION

The present invention provides an electrospray apparatus comprising integrated electrodes and improved methods of making the same. In one aspect, it features an electrospray apparatus comprising two planar substrates, where at least one features a conductive region and at least one tapers to form a tip at the electrospray orifice. In some embodiments, the conductive region comprises a conductive material deposited onto a surface of the substrate, for example in a pattern. In some embodiments, the conductive region comprises a conductive component on a surface portion or all of the substrate. Some embodiments include a third planar substrate, where the substrate featuring the conductive region is at least one substrate removed from the electrospray orifice. In another aspect, the invention features methods of making such electrospray apparatuses.

I. Electrospray Ionization Systems

Certain embodiments of the present invention provide electrospray apparatuses that assist in the formation of a relatively stable Taylor cone from an electrospray tip, providing electrospray ionization sources for forming spots, depositing materials on surfaces, nanostructure fabrication (Craighead et al., *Appl Phys Lett*, 83 (2): 371-373 Jul. 14, 2003, Craighead et al., *J Vac Sci Technol B*, 21 (6): 2994-2997 November-December 2003) and for analytical applications, such as mass spectrometry.

Figure 1:
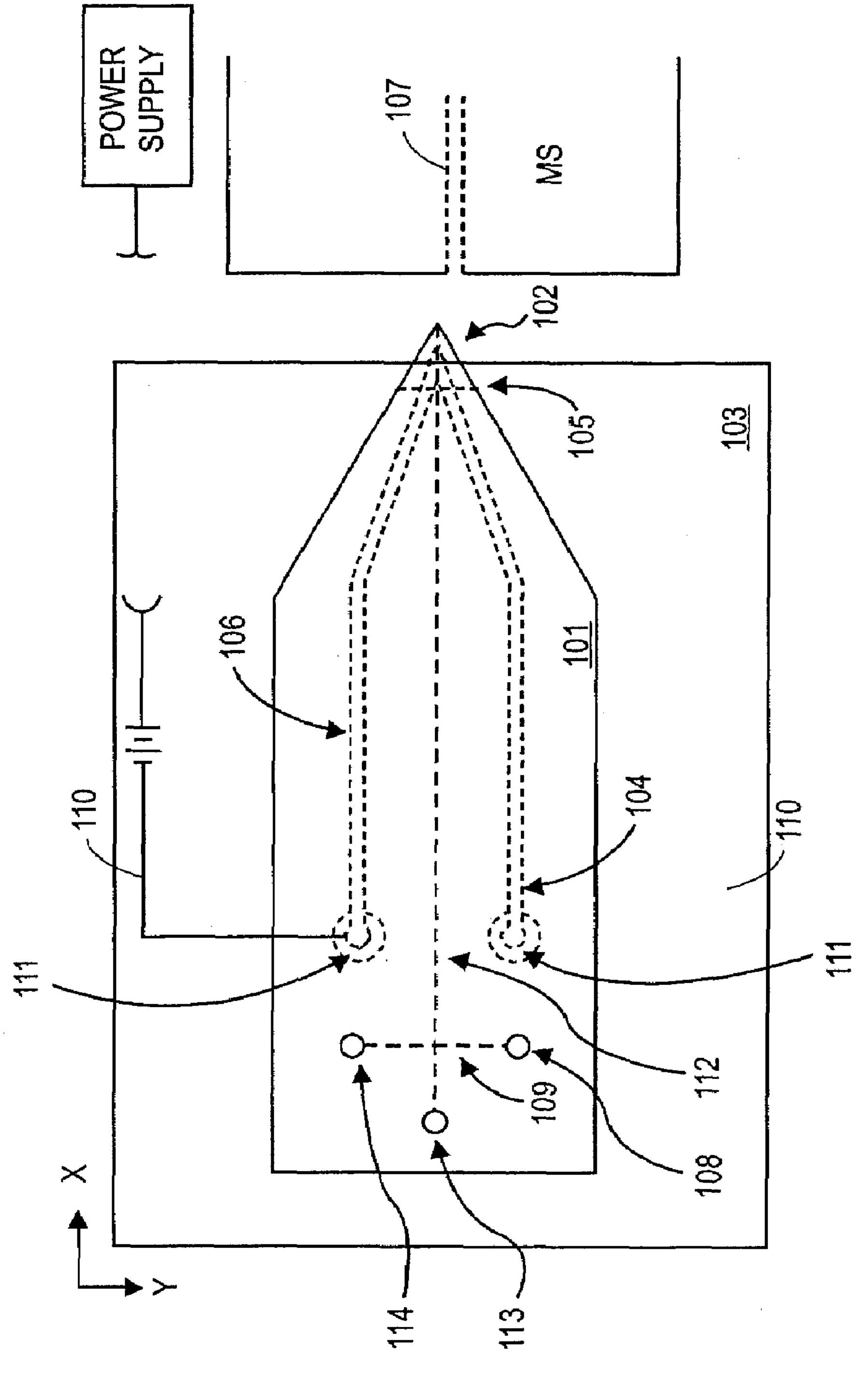
FIG. 1 shows a simplified top view of a table mounted electrospray ionization system for directing ionized spray into a neighboring mass spectrometer.

FIG. 1 illustrates the incorporation of an electrospray apparatus of the present invention into an electrospray ionization (ESI) system for mass spectrometry analysis. The electrospray apparatus comprises a microfluidic device 101 with an electrospray tip 102 that can be mounted as illustrated on a XY table or other adjustable platform 103 that is adjacent to the mass spectrometer (MS) such as an ABI Mariner time-of-flight (TOF) instrument. A variety of other mass analyzers can also be used, including but not limited to Quadrupole, Fourier Transform (FTMS), Ion Trap, or hybrid mass analyzers. The microfluidic device 101 comprises a first planar substrate 104 coupled to a second planar substrate 105. "Planar" as used herein does not require that the substrate be entirely flat or even. In some embodiments, "a planar substrate" refers to a substrate having at least one surface that is at least substantially flat, rather than, e.g., curved, columnar, or spherical.

At least one of the first or second planar substrates tapers to form the electrospray tip 102. In the illustrated embodiment, both the first planar substrate 104 and the second planar substrate 105 taper to form the electrospray tip 102, with the first planar substrate tapering to a point and the second planar substrate tapering to form a blunter edge 105 beyond which the point extends. In other embodiments, both planar substrates can taper to a point. In still other embodiments, the second planar substrate can taper to a point, for example a point extending beyond the edge of the first planar substrate, where the first planar substrate either does not taper or tapers to form a blunter edge. "Point" as used herein does not require tapering to a sharp point or tip, but includes less sharp edges as will be obtained in practice. Preferably, the point is as sharp as needed to facilitate formation of an electrospray at the tip.

In some embodiments, the second planar substrate is in turn coupled to a third planar substrate, where at least one of the second or third planar substrates tapers to form the electrospray tip 102. Such an embodiment may be referred to as a "three-substrate embodiment" indicating an embodiment comprising at least three planar substrates, as opposed to a "two-substrate" embodiment, which describes the situation where only at least two planar substrates are used. In some three-substrate embodiments, the second planar substrate can taper to a point and the third planar substrate can taper to form a blunter edge 105 beyond which the point extends. In other three-substrate embodiments, both the second and third planar substrates can taper to a point. In still other three-substrate embodiments, the third planar substrate can taper to a point, for example a point extending beyond the edge of the second planar substrate, where the second planar substrate either does not taper or tapers to form a blunter edge. In some embodiments, the first, second and third planar substrates can taper, helping to form the electrospray tip.

The electrospray tip 102 of the table-mounted device 101 can be positioned to direct ionized spray into the MS. The first planar substrate can feature a conductive region 106 that can serve as an integrated electrode for electrospray formation. The conductive region can comprise a layer or trace of conductive material, e.g., deposited onto a surface of the first planar substrate 104 or it can comprise a conductive component, e.g., added to a surface portion of the first planar substrate. In some embodiments, the conductive region can extend over most or all of a surface of the first planar substrate, for example, where conductive material has been deposited onto most or all of the surface, or conductive component has been added to all of the first planar substrate. In some embodiments, either one or more surfaces of the first, second, third or other planar substrates may feature conductive regions. Further, some embodiments feature both deposited conductive material and added conductive component as the conductive region.

In preferred two-substrate embodiments, the conductive region is in a pattern on a surface of the first planar substrate. One embodiment features a conductive region on the second planar substrate. Other embodiments feature a single trace or more than two traces of conductive material on the first or second planar substrates. In preferred three-substrate embodiments, the conductive region is not in a pattern on the surface of the first planar substrate, as described in more detail below. One embodiment features a conductive region on any of the first, second, third or other planar substrates. Other embodiments can feature a single trace or more than two traces of conductive material on the first, second or third planar substrates.

In either case, the conductive region may extend towards the edge of the planar substrate, preferably to about 10-about 1,000 μm, more preferably to about 40-about 200 μm, and even more preferably to about 20-about 30 μm from the edge of the substrate. This distance from the edge helps reduce arcing that may result when a relatively high voltage is applied, for example, when a voltage is applied across the tip 102 and a MS to create electrospray ionization at the tip.

The table 103 may be positioned and adjusted as needed to direct the electrospray tip 102 and electrospray emissions into the capillary portion or receiving orifice 107 of the MS. In addition, the device 101 may include one or more reservoirs and/or channels that can hold various fluids to be analyzed or run through the MS. For example, the device 101 may include a plurality of sample reservoirs 108 and/or other reservoirs 113, 114, and/or channels 109, 112. Microfluidic herein means that the surface features of the substrate, such as channels and/or reservoirs have at least one dimension less than about 1 mm, preferably in the range of about 0.5 to about 500 microns.

At least one of the planar substrates of the microfluidic device 101 may contain one or more such channels and/or reservoirs. Each of the reservoirs may be fluidly and separately connected to a channel 109, 112. One or more channels that extend towards the electrospray tip can form the spraying channel 112. A fluid pump may also be selected to impart flow of fluids within the network of channels within the microfluidic device 101. Possible pumping methods include, for example, pressure-driven by an external pneumatic or hydraulic pressure source, electroosmotically generated pressure, electroosmotic flow, volumetric pumping, gas generation in a microfluidic device, and the like.

An electrode 110 connected to a power source may be contacted with the conductive region 106 at one or more contact points 111, so that a voltage is applied between the tip 102 and the MS. Depending on the selected embodiment, an opening can be made on the substrate surface opposite the one on which the conductive region 106 is located in order to enable access by the electrode 110. The contact points 111 may be broader than the rest of the conductive region, for example, the rest of the trace of deposited conductive material, to facilitate contact with the external electrode 110. In preferred two-substrate embodiments, the conductive region 106 of the first planar substrate 104 is in a pattern, more preferably a pattern that avoids one or more of the microfluidic channels and/or reservoirs of the microfluidic device 101. In three substrate-embodiments, the conductive region need not be in a pattern as contact with a microfluidic channel and/or reservoir can be avoided by use of an additional substrate. That is, the first planar substrate can feature the conductive region while at least one of the second or third planar substrates can feature one or more microfluidic channels and/or reservoirs that are sealed and/or enclosed by the other of the second or third planar substrates.

An electrospray interface generally allows analytes in solution to be ionized before they are presented for mass spectrometry detection. Electrospray ionization generates ions for mass-spectroscopic analysis of various materials, including chemical or biological specimens. The ESI process typically involves forcing a solution of analytes through a channel, and applying a potential difference between the solution at the tip of the spraying channel and an external counter electrode. The value of the electric potential typically ranges from about 1 to about 7 kV. The high electric field thereby generated induces charges on the surface of the solution in the area of the spraying tip. When this field is high enough, the liquid at the tip takes on the shape of a cone, often referred to as a Taylor cone. Spraying generally occurs when the Coulombic forces are great enough to overcome the surface tension forces in the solution, and the spray emits as a thin jet at the tip of the Taylor cone. This jet breaks up into finely-dispersed, charged droplets, which then evaporate to produce ions representative of the analyte species contained in the solution.

To carry out electrospray ionization mass spectrometry using the system of FIG. 1, the microfluidic device 101 is often positioned so that its electrospray tip 102 is spaced a few millimeters from the MS, for example, from about 1 to about 20 mm, preferably about 1 to about 5 mm, and aligned with a receiving orifice 107 of the MS. A sample is introduced into a sample introduction reservoir 108 using a suitable sampling device such as a micropipette or syringe. Furthermore, to carry out the electrospray ionization process, a relatively high voltage and low current power supply can be selected to apply the electrospray voltage, e.g., about 3 to about 5 kV, with one or more external wires 110 that can contact the conductive region 106 of the electrospray tip 102 at one or more contact points 111. Meanwhile, voltages can be applied across the various channels 109, 112 to direct flow in the network, effecting fluidic manipulations, including capillary electrophoresis, isoelectric focusing, capillary electrochromatography, and other separations with photometric, fluorometric, electrochemical, and mass spectrometric detection methods. The voltages can also drive the sample through the spraying channel 112 towards the electrospray tip 102, to undergo electrospray ionization. The spray formed can enter the receiving orifice or capillary portion 107 of the MS, where it can be analyzed. It shall be understood that other known voltage driving mechanisms may be selected to effect fluid transport and separation throughout the microfluidic devices herein such as selectively applying voltages to electroosmotic pumps that can in turn drive liquids by application of pressure, which enables other separation methods, such as liquid chromatography.

II. Electrospray Apparatuses

Figure 2A:
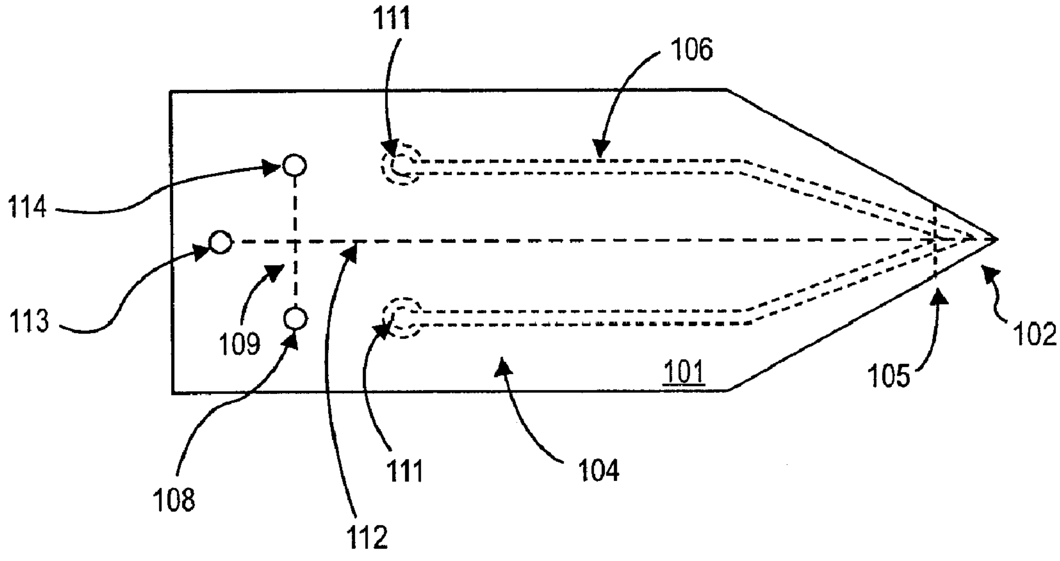
FIG. 2 shows two perspectives of one embodiment of an electrospray apparatus having a tip with integrated electrodes (a-b).
Figure 2B:
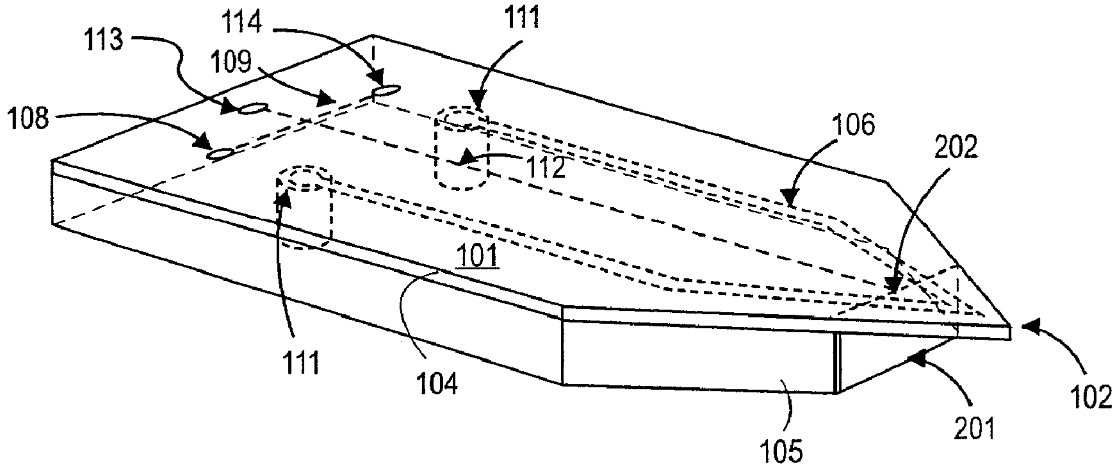

Certain embodiments of the present invention feature a microfluidic electrospray apparatus comprising a tip with integrated electrodes. FIGS. 2*a-b* illustrate two perspectives of two-substrate embodiment of an electrospray apparatus with patterned integrated electrodes. The electrospray apparatus comprises a microfluidic device 101 with an electrospray tip 102. The microfluidic device 101 comprises a first planar substrate 104 coupled to a second planar substrate 105. The first planar substrate 104 features a conductive region 106 that can form the integrated electrode, comprising for example conductive material deposited onto its surface, a conductive component added to a surface portion of the first planar substrate, or a combination thereof.

In some embodiments, the first planar substrate is less thick than the second planar substrate. FIG. 2*b* illustrates this situation in the embodiment depicted therein. In other embodiments, the first planar substrate is (approximately) as thick as the second planar substrate, for example, each about 1 mm thick. In still other embodiments, the first planar substrate is thicker than the second planar substrate.

At least one of the first or second planar substrates tapers to form the electrospray tip 102. FIG. 2 illustrates how both the first planar substrate 104 and the second planar substrate 105 can taper to help form the electrospray tip. The perspective of FIG. 2*b* illustrates how the first planar substrate 104 tapers to form a pointed tip 102, while the second planar substrate tapers to form a blunter edge 201. The pointed tip 102 of the first planar substrate 104 extends beyond the blunter edge 201 of the second planar substrate 105 to form a substantially-triangular tip 102 of the electrospray. In other embodiments, both planar substrates can taper to a point. In still other embodiments, the second planar substrate can taper to a point, for example a point extending beyond the edge of the first planar substrate, where the first planar substrate either does not taper or tapers to form a blunter edge.

At least one of the first and/or second planar substrates can contain one or more microfluidic reservoirs and/or channels, with at least one dimension less than about 1 mm, preferably in the range of about 0.5 to about 500 microns. Coupling of the first planar substrate to the second planar substrate can enclose or seal the channels and/or reservoirs. FIGS. 2*a-b* illustrate an embodiment where a surface of the second planar substrate 105 features microfluidic reservoirs 108, 113, and 114 and channels 109 and 112. Coupling of the first planar substrate to this surface encloses and seals the channels and reservoirs.

The substrate(s) may feature a variety of reservoir and/or channel patterns and configurations. FIG. 2, for example, illustrates two intersecting channels 109 and 112 that form an intersection or cross with three reservoirs 108, 113, 114. One channel 109 runs from a sample reservoir 108 to a waste reservoir 114 on the other side of the intersection or cross. The second channel 112 extends from a third reservoir 113, the buffer reservoir, to the electrospray tip 102. Other embodiments may feature other channel and/or reservoir configurations, including configurations formed from the first and second planar substrates each bearing one or more channels and/or reservoirs, as well as configurations where more than one channel 112 extend to the electrospray tip 102.

A channel in at least one of the first or second planar substrates can extend towards the electrospray tip to form the spraying channel 112. FIGS. 2*a-b* illustrate a channel 112 in the second planar substrate 105 extending to the blunter edge 201 that forms the spraying channel. In this embodiment, the spraying channel exits the apparatus as an aperture in the blunter edge 201 that forms the spraying outlet or electrospray orifice 202. In some embodiments, more than one channel may extend towards the electrospray tip to form more than one spraying channel. Different fluids may emit from the one or more spraying channels for spotting or for analysis by a mass spectrometer or other analytical apparatus.

In some embodiments, the conductive region 106 at least partly lies between the first planar substrate 104 and the second planar substrate 105 at or near the electrospray tip 102. For example, the conductive region may be on a surface of the first planar substrate that couples to a surface of the second planar substrate; or the conductive region may be on both the first and second planar substrate surfaces that couple to each other. In such designs, the conductive region 106 is at least partly "sandwiched" between two substrates, protecting it from the environment while allowing its placement close to the outlet 202 of the spraying channel 112.

In other embodiments, the conductive region is at least partly on an outside surface, rather than on a surface of the first or second planar substrate that couples to the other planar substrate. For example, the conductive region may be on a surface of the first planar substrate that faces away from the second planar substrate; the conductive region may be on a surface of the second planar substrate that faces away from the first planar substrate, or the conductive region may be on both outside surfaces of the first and second planar substrates. In such designs, all or most of conductive region 106 may be exposed on one or both sides of the microfluidic device 101. Still other embodiments feature conductive material both between the first and second planar substrates and on an outside surface or outside surfaces.

The conductive region may be in a pattern on the surface of the first and/or second planar substrates. In the embodiment illustrated in FIGS. 2*a-b*, the conductive region forms a V-shaped pattern on the first planar substrate that follows the perimeter of the tapered tip 102. The conductive region 106 extends beyond the blunt edge 201 of the second planar substrate, which can serve as an integrated electrode for the electrospray tip 102 of the apparatus. In preferred embodiments, the conductive region does not extend to the very edge of the planar substrate(s). For example, the conductive region preferably extends to about 10-about 1,000 μm, more preferably to about 40-about 200 μm, and even more preferably to about 20-about 30 μm from the edge of the substrate. As discussed above, this distance form the edge can help reduce arcing in some applications using the electrospray apparatus.

Additionally, in preferred two-substrate embodiments, the conductive region 106 is in a pattern, more preferably a pattern that avoids one or more of the microfluidic channels and/or reservoirs of the microfluidic device 101. FIGS. 2*a-b*, for example, illustrates a V-shaped pattern of the conductive region 106 on the first planar substrate that avoids the microfluidic reservoirs 108, 113, 114 and channels 109, 112 contained in the second planar substrate. The spraying channel 112, for example, runs between the two arms of the V-shaped pattern, and ends at the spraying outlet 202 before the two arms meet at the point of the "V."

The conductive region 106 can be formed as an integrated electrode featuring one or more contact points 111 for contacting an external voltage. In this way, contact with the external voltage need not be made near or at the electrospray tip of the electrospray apparatus. The contact points 111 may be broader than the rest of the conductive region, for example, the rest of the trace of deposited conductive material, to facilitate contact with an external electrode. The contacts points of two-substrate embodiments also preferably avoid one or more of the microfluidic channels and/or reservoirs of the microfluidic device 101.

Figure 3A:
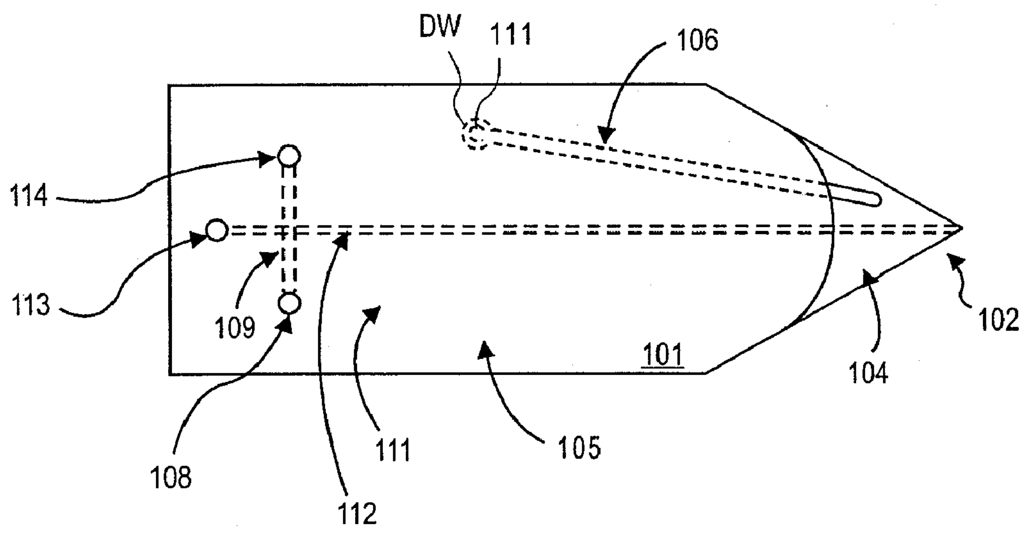
FIG. 3 shows two perspectives of another embodiment of an electrospray apparatus having a tip with integrated electrodes (a-b).
Figure 3B:
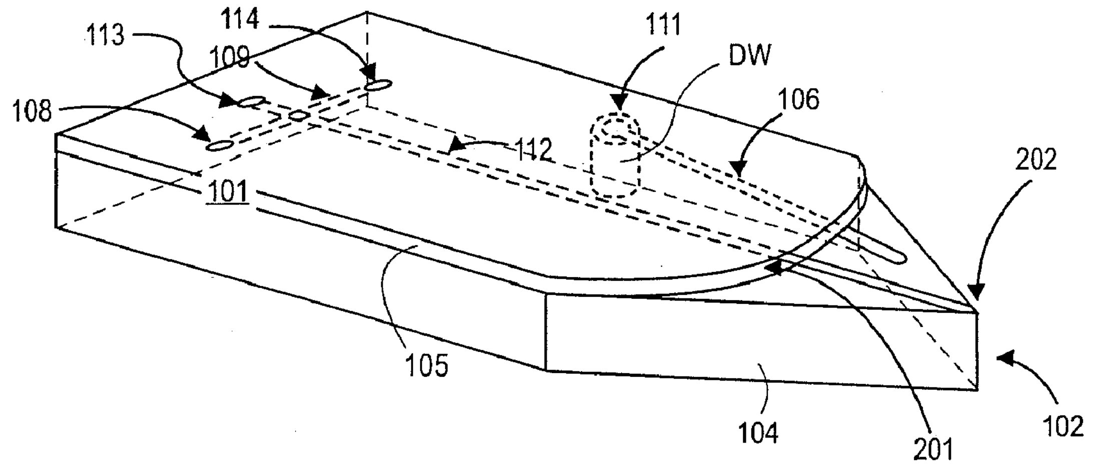

FIGS. 3*a-b* illustrate two perspectives of another two-substrate embodiment of an electrospray apparatus with integrated electrodes. The electrospray apparatus again comprises a microfluidic device 101 with a first planar substrate 104 coupled to a second planar substrate 105, where the first planar substrate 104 features a conductive region 106 that can form the integrated electrode for an electrospray tip 102.

In the embodiment depicted in FIG. 3, however, the first planar substrate is thicker than the second planar substrate and features a surface containing microfluidic reservoirs 108, 113, and 114 and channels 109 and 112. Coupling of this surface to the second planar substrate 105 encloses and seals the channels and reservoirs. Further, in this embodiment, the first planar substrate 104 tapers to form a pointed tip 102, while the second planar substrate tapers slightly to form a blunter edge 201. The pointed tip 102 of the first planar substrate 104 extends beyond the blunter edge 201 of the second planar substrate 105 to form a substantially-triangular tip 102 of the electrospray. FIGS. 3*a-b* also illustrate a channel 112 in the first planar substrate 104 extending to the electrospray tip 102, that forms the spraying channel and the spraying outlet 202.

The conductive region in FIG. 3 forms a simple pattern on the surface of the first planar substrate, comprising a line or trace, for example, of conductive material deposited on the surface and/or a conductive component added to a surface portion thereof. Again in this embodiment, the conductive region 106 partly lies between the first planar substrate 104 and the second planar substrate 105 near the electrospray tip 102, and avoids the microfluidic channels and reservoirs of the microfluidic device 101. The conductive region 106 can thus provide an integrated electrode featuring a contact point 111 serving as an electrical contact to a high voltage supply. The contact point 111 is formed on the other end of the trace remote from the tip region. In addition, a dry well (DW) or opening on the second planar substrate 105 may be formed as shown in order for the voltage supply to gain access to the contact point 111 of the conductive region 106. The contact point 111 is thus preferably formed on the other side of the conductive region 106 far away from the electrospray tip avoiding the microfluidic channels and reservoirs.

The two-substrate embodiments of the present invention can provide a number of advantages. It will be appreciated that the conductive region 106 can form an electrode for applying an electrospray voltage to solution in the spraying channel 112, at or near the ESI tip 102. That is, in certain embodiments, the conductive material creates an integrated electrode for an external contact with the solution in a region local to the electrospray tip. Contact can be made with an external wire at any point of the conductive region 106, that is, for example, where conductive material is deposited onto a surface of the first planar substrate and/or where conductive component is added to a surface portion thereof. A dry well or opening in one of the substrates may again be formed to enable contact with the conductive region. For embodiments of the invention herein where ionic conductors are selected for the conductive region 106, this arrangement can reduce the interference of the bubbles formed in the solution with the electrospray. Such bubble formation may occur, for example, when electrical conductance changes from conductance by electrons in an external wire to conductance by ions in a solution. The integrated conductive region 106 that preferably avoids microfluidic channels and reservoirs can avoid such bubble formation in the channels within the microfluidic device.

This arrangement also proves advantageous in certain applications, for example in microfluidic separations, where contact with the integrated conductive region 106 can help avoid interference with other required contacts that effect separation. As noted above, voltages can be applied across the various channels 109, 112 to direct flow in the network of microfluidic channels, as well as to effect fluidic manipulations such as capillary electrophoresis. For example, a sample loaded in a sample reservoir 108 can be moved towards a waste reservoir 114 by application of a voltage across 108 and 114. A voltage applied across the buffer reservoir 113 and the electrospray tip 102 then can effect capillary electrophoresis, separating components of the sample as it travels down the microfluidic channel 112. The conductive region 106, with possibly one or more contact points 111, can be in a pattern than avoids the contacts required to effect such separation.

Also, the conductive region can be made before the first and second planar substrates are coupled to each other, for example by depositing a conductive material onto a surface of a first planar substrate and/or adding a conductive component to a surface portion or all thereof; and thereafter coupling the first planar substrate to the second planar substrate. This approach can avoid the problem of conductive material getting into (and blocking) the spraying outlet of the microfluidic device, for example, where one attempts to deposit conductive material later.

Further, this arrangement facilitates contact at or near the electrospray tip, reducing the potential drop that may occur when the electrospray potential is applied upstream and facilitating more consistent spray voltages and stable electrospray formation. When the voltage is applied at or near to the spraying tip, it avoids the generation of a pressure gradient, eliminating parabolic flow and peak dispersion that may otherwise occur.

Moreover, two-substrate embodiments of the present invention can reduce the number of separate components needed to effect microfluidic electrospray, as well as reducing the requirement of carefully aligning certain external components relative to the electrospray tip. While an external sheath flow may be used with the electrospray tip, as shown in Bousse et al., U.S. Pat. No. 6,803,568 (Published Application Ser. No. US20040113068 "Multi-channel Microfluidic Chip for Electrospray Ionization") incorporated by reference herein in its entirety, the integrated contacts of this invention can render sheath flow unnecessary. The integrated conductive region can thus simplify manufacture, decreasing costs and facilitating reproducibility on a large-scale. These and other embodiments of the invention hence provide convenient fabrication methods for economically manufacturing microfluidic electrospray apparatuses, as will be described in more detail below.

FIGS. **4*a*-*b* illustrate two perspectives of a three-substrate electrospray apparatus having integrated electrodes. A conductive region 106 again features a contact point 111 serving as an electrical contact to a high voltage supply. The contact point 111 is formed on the other end of the trace remote from the tip region. In addition, a dry well (DW) or opening on a first planar substrate 104 may be formed as shown in order for the voltage supply to gain access to a contact point 111 of the conductive region 106. In order to avoid drilling a DW opening which could remove the contact point 111 to the conductive region 106 and possibly leaving only its edge available for electrical contact, it may be preferable instead to form the opening in second and third substrates, 105 and 401 respectively. In this alternate configuration, the DW can be positioned on the relative top portion of the device along with other reservoirs shown (108, 113, 114) having openings formed through both the third and second substrates 401 and 105 respectively, which provides access to the contact point 111. The electrospray apparatus thus comprises a microfluidic device 101 with an electrospray tip 102 having the first planar substrate 104 coupled to the second planar substrate 105, which is itself coupled to the third planar substrate 401. The first planar substrate 104 features the conductive region 106** that can form the integrated electrode, comprising for example conductive material deposited onto its surface, a conductive component added to a surface portion of the first planar substrate, or a combination thereof. In some embodiments, the second and/or third planar substrates may also feature conductive region(s).

In some three-substrate embodiments, the first planar substrate is less thick than the second and/or third planar substrates. In some three-substrate embodiments, the first planar substrate is (approximately) as thick as the second and/or third planar substrates. In still other three-substrate embodiments, the first planar substrate is thicker than the second and/or third planar substrates. FIG. **4*b* illustrates a three-substrate embodiment where the first planar substrate 104 is less thick than the second planar substrate 105 but (approximately) as thick as the third planar substrate 401**.

Figure 5:
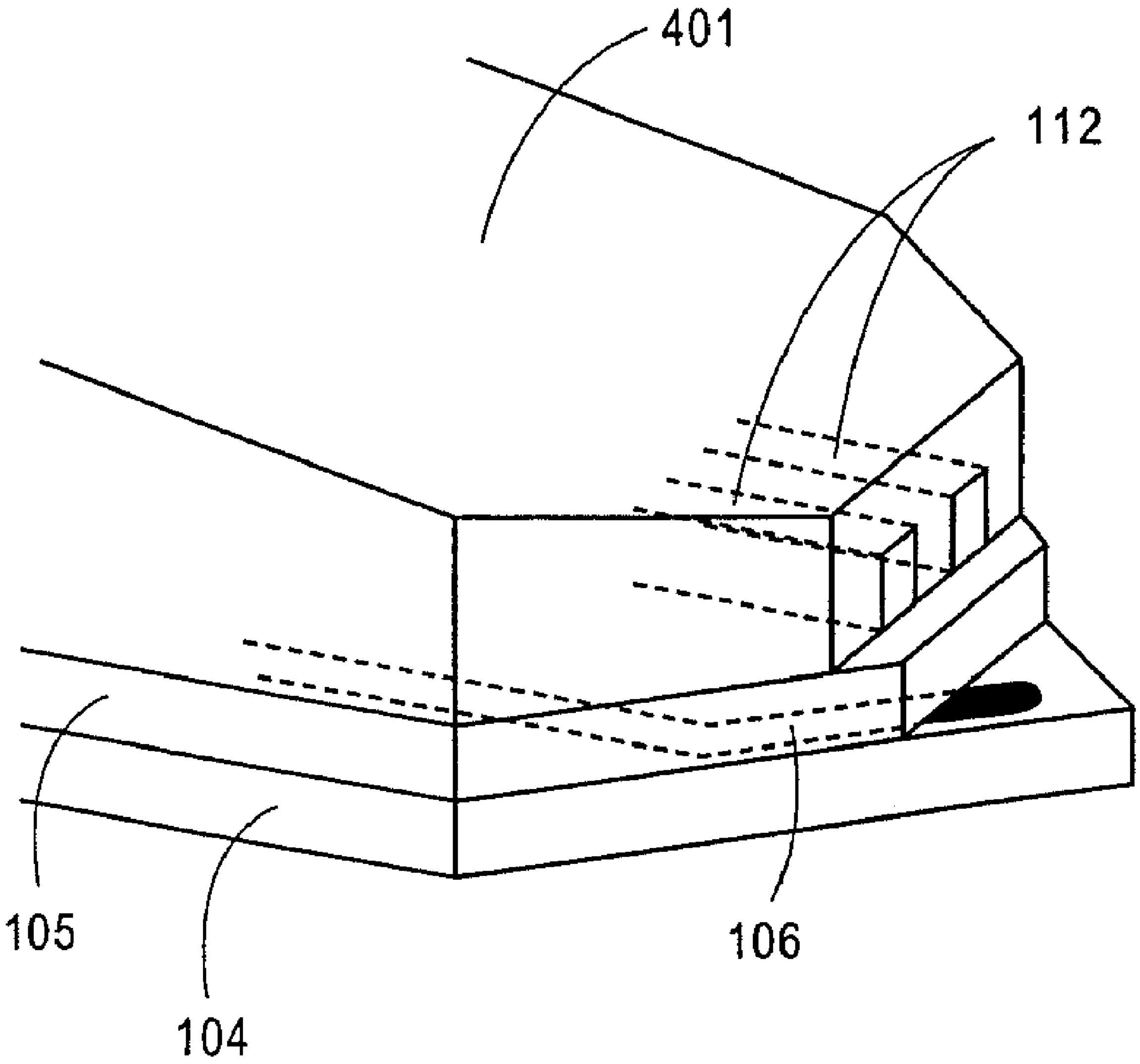
FIG. 5 shows a perspective drawing of an electrospray tip with an integrated electrode.

Other thickness ratios of first, second, and third planar substrates are also contemplated by the present invention. As shown in FIG. 5, for example, the first planar substrate 104 may be (approximately) as thick as the second planar substrate 105 but less thick than the third planar substrate 401 (not entirely to scale as shown) so that the relatively thicker third planar substrate 401 can be preferably formed with embossed channels as described further elsewhere herein.

In alternate embodiments of the invention, an electrospray tip can be formed by the furthest extended tapered planar substrate among the first, second or third planar substrates. For example, as shown in FIG. 5, a sharp tip could be formed along a first planar substrate 104 while a blunt edge can be formed at the end of the second planar substrate 105. Meanwhile, the illustrated embodiment shown in the FIG. 4 includes a second planar substrate 105 that tapers to form the electrospray tip. The perspective of FIG. **4*b* illustrates how the second planar substrate 105 tapers to form a pointed tip 102, while the third planar substrate 401 does not taper, but ends in a blunt edge 402. The pointed tip 102 of the second planar substrate 105 extends beyond the blunt edge 402 of the third planar substrate 401 to form a substantially-triangular tip 102** of the electrospray. In other embodiments, both second and third planar substrates can taper. For example, both second and third planar substrates can taper to a point; or the second planar substrate can taper to a blunter edge while the third planar substrate tapers to a point extending beyond the edge of the second planar substrate; or the third planar substrate can taper to a blunter edge while the second planar substrate tapers to a point extending beyond the edge of the third planar substrate. In still other embodiments, the third planar substrate can taper to a point, for example a point extending beyond the edge of the second planar substrate, where the second planar substrate does not taper. In yet still other embodiments, first, second and third planar substrates can taper.

Figure 4A:
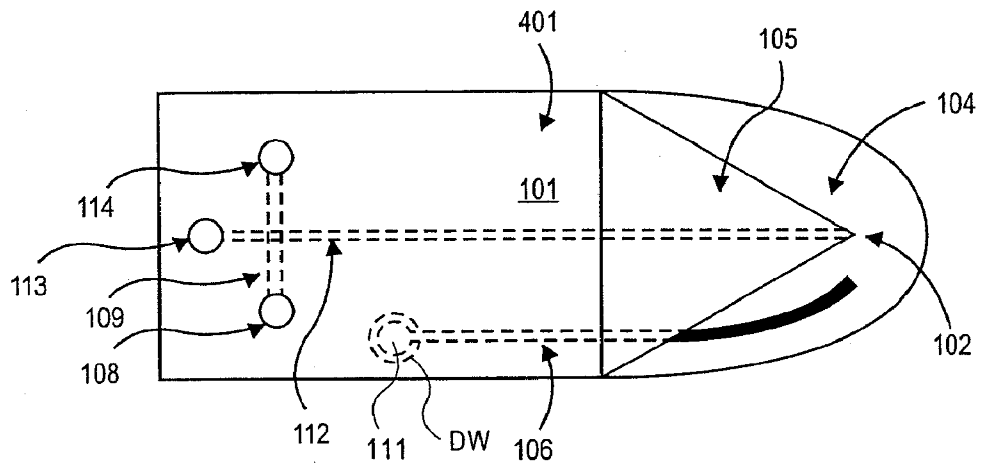
FIG. 4 shows two perspectives of another embodiment of an electrospray apparatus having a tip with integrated electrodes (a-b).
Figure 4B:
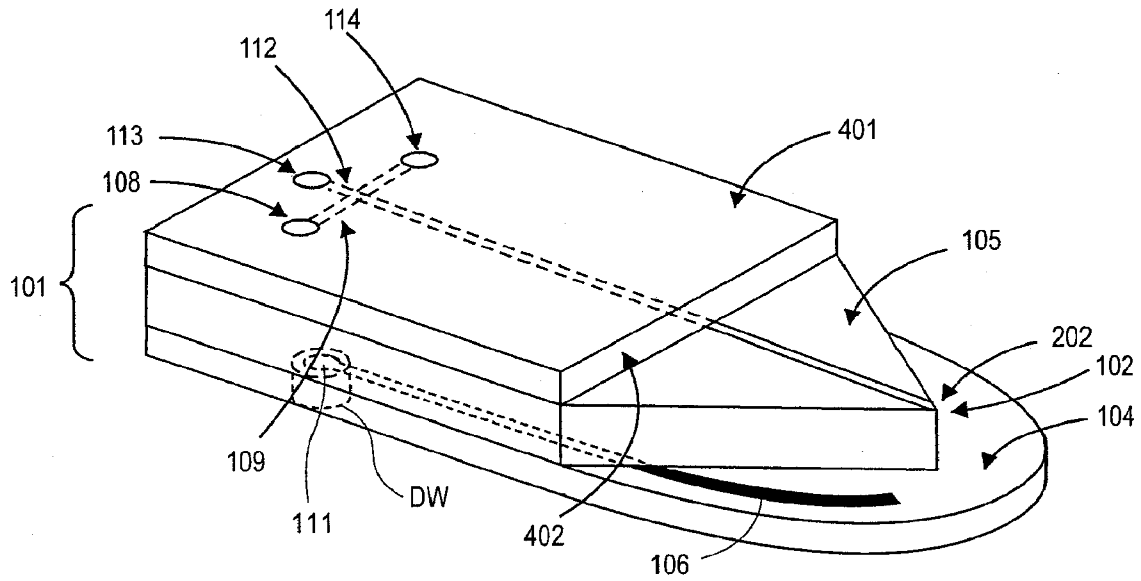

At least one of the second 105 and/or third 401 planar substrates can contain one or more microfluidic reservoirs and/or channels, with at least one dimension less than about 1 mm, preferably in the range of about 0.5 to about 500 microns. Coupling of the second planar substrate to the third planar substrate can enclose or seal the channels and/or reservoirs. FIGS. 4*a*-*b* illustrate an embodiment where a surface of the second planar substrate 105 features microfluidic reservoirs 108, 113, and 114 and channels 109 and 112. Coupling of the third planar substrate 401 to this surface encloses and seals the channels and reservoirs, but as with other formed reservoirs herein it shall be understood that access points or openings are provided in a selected planar substrate to allow the introduction of samples buffers etc. A preferable alternate embodiment of the invention includes channels and reservoirs formed on the bottom surface of a relatively thicker third substrate 401 that are enclosed when sandwiched with a second planar substrate 105 (see FIG. 4 generally).

The substrate(s) may feature a variety of reservoir and/or channel patterns and configurations. FIG. 4, for example, illustrates two intersecting channels 109 and 112 that form an intersection or cross with three reservoirs 108, 113, 114. One channel 109 runs from a sample reservoir 108 to a waste reservoir 114 on the other side of the intersection or cross. The second channel 112 extends from a third reservoir 113, the buffer reservoir, to the electrospray tip 102.

A channel in at least one of the second or third planar substrates can extend towards the electrospray tip to form the spraying channel 112. FIGS. 4*a*-*b* illustrate a spraying channel 112 in the second planar substrate 105 extending to electrospray tip 102. In this embodiment, the spraying channel exits the apparatus as aperture at the uncovered tip and forms the spraying outlet or electrospray orifice 202. Other embodiments may feature other channel and/or reservoir configurations, including configurations formed from the second and third planar substrates each bearing one or more channels and/or reservoirs, as well as configurations where more than one channel 112 extends to the electrospray tip 102 to form more than one spraying channel and more than one spraying outlet 202. Different fluids may emit from the one or more spraying channels for spotting or for analysis by a mass spectrometer or other analytical apparatus. Yet other three-substrate embodiments may contain one or more reservoirs and/or channels between both second and third and first and second planar substrates, for example forming more than one spraying channels and spraying outlets between different substrate levels.

As in two-substrate embodiments provided herein, some three-substrate embodiments may include a conductive region 106 that at least partly lies between the first planar substrate 104 and the second planar substrate 105 at or near the electrospray tip 102. For example, the conductive region 106 may be on a surface of the first planar substrate 104 that couples to a surface of the second planar substrate 105, as depicted in FIG. 4*b*. Alternatively, the conductive region may be on both the first and second planar substrate surfaces that couple to each other. In such designs, the conductive region 106 is at least partly "sandwiched" between two substrates, protecting it from the environment while allowing its placement close to the outlet 202 of the spraying channel 112. The conductive region 106 also features a contact point 111 serving as an electrical contact to a high voltage supply. The contact point 111 can be formed on the other or opposite end of the trace relatively remote from the tip region. In addition, a dry well (DW) or opening on the first planar substrate 104 may be formed as shown in order for the voltage supply to gain access to the contact point 111 of the conductive region 106. More preferably, an opening is formed in the second and third substrates, 105 and 401 respectively (not shown). In this alternate configuration, the DW can be positioned on the relative top portion of the device along with other reservoirs (108, 113, 114), with openings formed through both third and second substrates 401 and 105 respectively, which provides access to the contact point 111.

In other embodiments, the conductive region is at least partly on an outside surface, rather than on a surface of a planar substrate that couples to another planar substrate. For example, the conductive region may be on a surface of the first planar substrate that faces away from the second planar substrate. In such designs, all or most of conductive region 106 may be exposed on one side of the microfluidic device 101. Still other embodiments feature conductive regions both between the first and second planar substrates and on an outside surface. Yet still other embodiments feature conductive regions between the first and second planar substrates and/or between the second and third planar substrates and/or on one or more outside surfaces, e.g., on the surface of the third planar substrate facing away from the second planar substrate.

In three-substrate embodiments, the first planar substrate featuring the conductive region 106, can be one substrate removed from the microfluidic reservoir(s) and/or channel(s) that lie between the second and third planar substrates. The conductive region 106 that provides integrated electrodes is thus one substrate layer removed from the electrospray orifice 202. Such embodiments provide a number of advantages. In certain three-substrate embodiments, the conductive region need not be in a pattern on the surface of the planar substrate and does not have to avoid the locations of the channels and reservoirs.

In the embodiment illustrated in FIGS. 2*a*-*b*, the conductive region forms a V-shaped pattern on the first planar substrate that follows the perimeter of the tapered tip 102. The conductive region 106 extends beyond the blunt edge 201 of the second planar substrate, to form an integrated electrode for the electrospray tip 102 of the apparatus. In preferred embodiments, the conductive region does not extend to the very edge of the planar substrate(s). For example, the conductive region preferably extends to about 10-about 1,000 μm, more preferably to about 40-about 200 μm, and even more preferably to about 20-about 30 μm from the edge of the substrate. As discussed above, this distance from the edge can help reduce arcing in some applications using the electrospray apparatus.

Additionally, in preferred two-substrate embodiments, the conductive region 106 is in a pattern, more preferably a pattern that avoids one or more of the microfluidic channels and/or reservoirs of the microfluidic device 101. FIGS. 2*a*-*b*, for example, illustrates a V-shaped pattern of the conductive region 106 on the first planar substrate that avoids the microfluidic reservoirs 108, 113, 114 and channels 109, 112 contained in the second planar substrate. The spraying channel 112, for example, runs between the two arms of the V-shaped pattern, and ends at the spraying outlet 202 before the two arms meet at the point of the "V."

The integrated electrode formed by the conductive region 106 may also feature one or more contact points 111 accessible to an external voltage through a dry well (DW) as previously shown. In this way, contact can be made far from the electrospray tip of the electrospray apparatus. Moreover, the contact points 111 may be formed broader or with a wider dimension than the rest of the conductive region or the trace of deposited conductive material, to facilitate contact with an external electrode. The contact points of two-substrate embodiments also preferably avoid one or more of the microfluidic channels and/or reservoirs of the microfluidic device 101.

In some embodiments, the first planar substrate is less thick than the second and/or the third planar substrate and the thicker second and/or third planar substrate can contain one or more microfluidic channels and/or reservoirs sealed by the other of the second or third planar substrates. In other embodiments, the first planar substrate is (approximately) as thick as the second planar substrate and the thicker third planar substrate contains one or more microfluidic channels and/or reservoirs sealed by the second planar substrate. It will be appreciated that in the three-substrate embodiments of the present invention the first substrate featuring the conductive region is one substrate removed from the microfluidic channel(s) and/or reservoir(s). In such embodiments, the conductive region may or may not be in a pattern.

A preferable embodiment of the invention provides that the microfluidic device is formed with multiple individual fluid channels. These fluid channels extend through the body of the microfluidic device and converge at the electrospray tip. There are numerous advantages in forming multiple channels that meet at a single tip on a microfluidic device. For example, this type of construction may enable analysis of several fluid samples in sequence on the same ESI tip. A calibration solution may be selected among these fluids to adjust the operating conditions of the ESI tip before the sample under test is analyzed. The calibration solution can be used in automating this process of adjusting and optimizing the positioning or conditions of the electrospray, including the physical location of the tip relative to the mass spectrometry instrument and the applied voltage. A calibration solution may also be provided to calibrate the mass spectrometer for mass accuracy, and thereby improve the performance of the instrument. An advantage of carrying out an optimization process on the same tip to be actually used for the samples under test is that the need for and repositioning of another tip may be avoided. Moreover, the ESI tips may each have a slightly different geometry and location relative to the mass spectrometer in some instances that would require additional alignment and repeated optimization. These and other drawbacks are avoided with the microfluidic chips provided in accordance with this aspect of the invention.

Another advantage of providing microfluidic devices with multiple individual channels meeting at a single tip is that an ionic conductor can be introduced to form a conductive region. In some embodiments of the invention, at least one of individual channels extending towards the electrospray tip (as described in U.S. Pat. No. 6,803,568) includes conductive material that serves as an ionic conductor. This conceptually serves a similar function as a salt bridge in the context of electrochemistry applications. The ionic conductor serves as an electrode in providing electrical contact, but rather than an electronic conductor such as a metal, it uses other selected materials such as electrolyte solutions. A preferable choice of electrolyte solution includes the use of a solution that is the same as or similar to the one selected for applications in other areas of a microfluidic device, such as the channels 109 or 112 that can be used for capillary electrophoresis, as described above. The ionic conductor is placed such that it makes contact with the solution being sprayed near the electrospray tip. At the other end of the ionic conductor, contact is made with an electronic conductor connecting to a voltage supply, preferably at a position removed from the electrospray tip. This arrangement has the advantage that any electrochemical reactions at the interface between electronic and ionic conduction occur distally or relatively far removed from the electrospray tip, and thus cannot disrupt the spray process. Such disruption could occur by the generation of ions or gases by these electrochemical reactions. The ionic conductors herein can be formed in a microfluidic device herein from a channel, reservoir and external contact. A channel containing an ionic conductor can form an electrode that is filled with a gel or other viscous material, or a cross-linked gel, to reduce or eliminate fluid flow.

Figure 10:
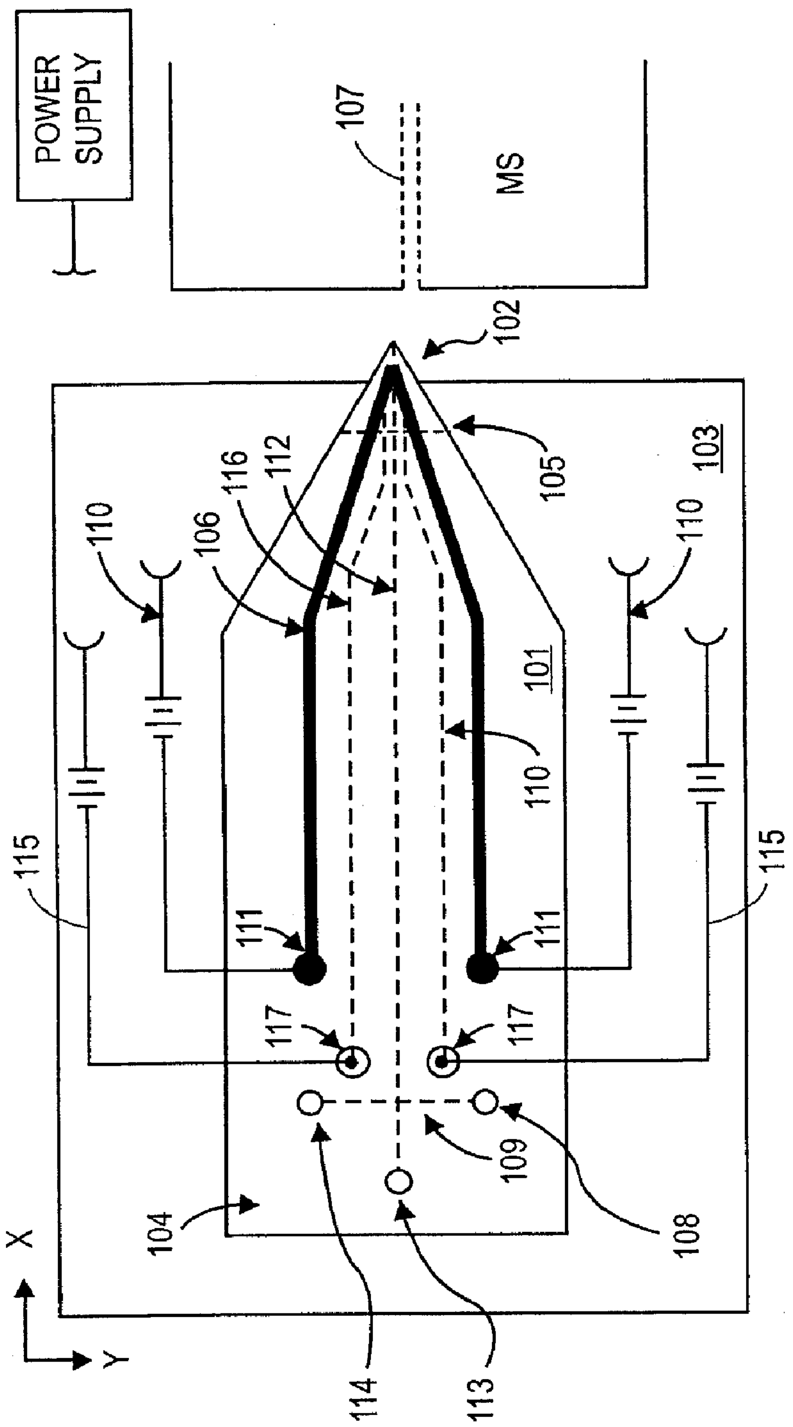
FIG. 10 shows a microfluidics device having integrated electrodes including an ionic conductor electrode formed from conductive material contained within one or more channels and/or reservoirs.

FIG. 10 illustrates an alternative design for a microfluidic device 101 having one or more electrodes formed from ionic conductor and/or electronic conductor materials. For certain applications it may be preferable to include either or both ionic conductors or metal conductors. Furthermore, the device 101 may include reservoirs and/or channels that can hold a conducting gel or other viscous material. For example, the device 101 may include a channel 116 and/or a reservoir 117 that forms an electrode with an ionic conductor that extends to the electrospray tip 102. At least one of the planar substrates of the microfluidic device 101 may contain one or more such channels and/or reservoirs. An electrode 115 connected to a power source may be inserted into reservoir 117 so that voltage is applied between the reservoir and the mass spectrometer. One or more channels that extend towards the electrospray tip can form the spraying channel 112.

Figure 11:
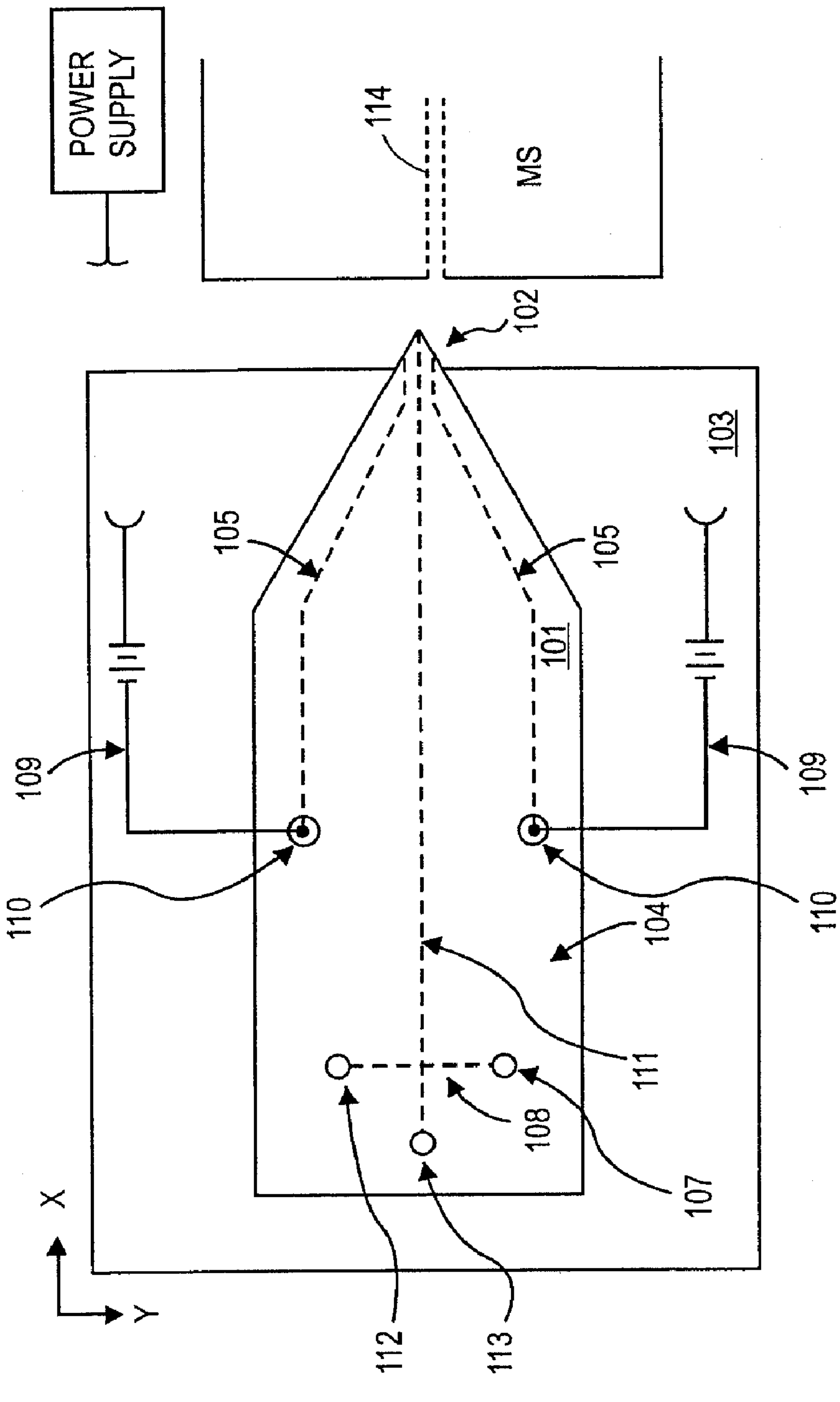
FIG. 11 shows a microfluidics device containing one or more channels and/or reservoirs that form an ionic conductor electrode.

FIG. 11 illustrates a design for a microfluidic device 101 having one or more ionic conductor electrodes without a metallic or electronic electrode. The device 101 may include one or more reservoirs and/or channels that can hold gel or other viscous material. For example, the device 101 may include a channel 105 and/or a reservoir 110 that forms an electrode formed from a conductive material acting as an ionic conductor, which extends to the electrospray tip 102. At least one of the planar substrates of the microfluidic device 101 may contain one or more such channels and/or reservoirs. An electrode 109 connected to a power source may be inserted into a reservoir 110 so that a voltage is applied between the reservoir and the mass spectrometer. One or more channels that extend towards the electrospray tip can form the spraying channel 111.

The embodiments of the invention utilizing ionic conductors as electrodes can provide a number of advantages. It will be appreciated that the channel 116 in FIG. 10 and channel 105 in FIG. 11 forms an electrode for applying an electrospray voltage to the solution in the spraying channel, at or near the electrospray tip. That is, in certain embodiments, conductive material in channel 105 or 116 serves as an ionic conductor to an external contact in a region removed from the electrospray tip. Contact can be made with an external wire at the reservoir 110 in FIG. 10 and reservoir 109 in FIG. 11. This arrangement can reduce the formation of air bubbles in the solution, sometimes observed when electrical contact is made with the solution on its way towards the electrospray tip. Bubble formation may occur, for example, when electrical conductance changes from conductance by electrons in an external wire to conductance by ions in a solution.

The electrode formed by channel 116 and reservoir 117 in FIG. 10 preferably avoids microfluidic channels 112, 109 and reservoirs 108, 113 and 114. The electrode formed by channel 105 and reservoir 110 in FIG. 11 preferably avoids microfluidic channels 111, 108 and reservoirs 107, 112 and 113. The design of these electrodes formed by ionic conductors preferably avoids bubble formation in the channels within the microfluidic device.

Figure 12:
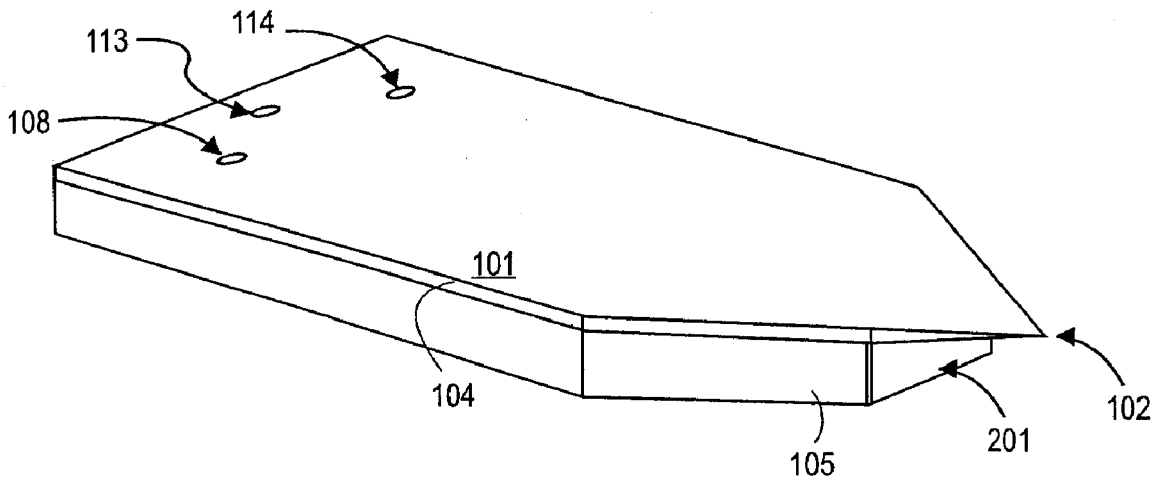
FIG. 12 illustrates a microfluidic device with an electrospray tip that includes a tapered point formed from relatively thin film laminate or planar substrate.

FIG. 12 illustrates another aspect of the invention that may be incorporated to any of the microfluidic devices provided in accordance with the invention. At least one planar substrate in these devices can be formed with a dual taper. The dual taper can be characterized as a relative narrowing, preferably but not exclusively to a sharp point, along two dimensional planes, e.g., XY plane. A first taper can be formed with a tapered width along an edge of a planar substrate, while a second taper can be formed with a tapered thickness along the same edge of the planar substrate. As with other embodiments of the invention, a planar substrate taper can be formed by known methods described elsewhere herein including machining, cutting, shaving techniques. As shown in FIG. 12, a dual tapered electrospray tip 102 can be thus provided. As with other described embodiments, a first planar substrate 104 and a second planar substrate 105 can both have a tapered width to help form the electrospray tip. The perspective illustrates how the first planar substrate 104 tapers to form a pointed tip 102 in both width and thickness, while the second planar substrate tapers to form a relatively blunter edge 201. The pointed tip 102 of the first planar substrate 104 extends beyond the blunter edge 201 of the second planar substrate 105 to form a substantially-triangular tip 102 of the electrospray. Some variations of the invention may provide a device where both substrates preferably taper to a point. It shall be understood that a dual-tapered electrospray tip can be incorporated into a planar substrate for any of the multi-layer embodiments of the invention.

III. Electrospray Tips

In certain embodiments, the invention provides an electrospray tip made by depositing a conductive material onto a first planar substrate and then forming the first planar substrate as the tip with an integrated electrode. For example, as shown in FIG. 5, an electrospray tip can be formed with a tapered first planar substrate that also includes a patterned integrated electrode.

FIGS. 3*a*-*b* illustrate a design where the electrospray tip 102 is substantially V-shaped. The tip 102 is formed from a first planar substrate having a deposited conductive material and coupled to a second planar substrate 105.

The first planar substrate tapers to form a pointed tip 102, while the second planar substrate 105 tapers to form a blunter tip edge. FIG. 3*a* illustrates how the film extends as a pointed tip 102 beyond the blunter tip of the second planar substrate 105, helping to form the electrospray tip 102. FIG. 3*a* also illustrates how the conductive material 106 on the first planar substrate forms a straight line-shaped pattern that substantially follows along an edge of the tapered tip 102. The conductive material 106 also extends beyond the blunter tip of the second planar substrate 105, to form an integrated electrode for the electrospray tip 102.

FIG. 3*b* illustrates a design where the electrospray tip 102 forms a substantially pinched-V shape. In this design, the first planar substrate 104 extends as a puckered "V" beyond the blunter tip edge 201 of the second planar substrate 105 to help form the electrospray tip 102. The conductive material 106 forms a pattern that substantially follows the perimeter of the film tip and extends beyond the blunt tip edge of the second planar substrate 105, forming a relatively straight integrated electrode for the electrospray tip 102.

The first planar substrate and second planar substrate may be composed of various materials known in the art, including glass, quartz, ceramic, silicon, silica, silicon dioxide or other suitable materials such as a polymer, copolymer elastomer or a variety of commonly used plastics. Examples of polymers include, but are not limited to, parylene C, poly (ethylene terephthalate) (PET), polyimide (PI), polycarbonate (PC), poly (dimethyl siloxane) or silicone elastomer (PDMS), silicone nitride, poly (methyl methacrylate) (PMMA), other acrylic-based polymers, Zeonor (a cyclic olefin polymer) (http://www.zeonchemical.com/company/specialty.asp), other cyclic olefin polymers, poly(2-ethyl-2-oxazoline) (PEOX), polystyrene, polyester (Mylar®), photoresist, hydrogels, thermoplastics, and the like.

In one preferred embodiment of the invention, Computer-Numerically-Controlled (CNC) milling is employed to form an electrospray tip. Milling by a CNC machine provides automatic, precise, and consistent motion control. A CNC machine has two or more directions of motion, called axes, which can be precisely and automatically controlled along their lengths of travel. Unlike a conventional machine, which may be set in motion by turning cranks and handwheels, a CNC machine is set in motion by programmed commands entered by an operator. Possible commands include the motion type (rapid, linear, and circular), the axes to move, the amount of motion, the motion rate, and the spindle speed http://www.seas.upenn.edu/~meam100/cnc/basics_1.html. In this embodiment, a conductive material is deposited on a first planar substrate. A series of channels are embossed or molded, and/or reservoirs are drilled into a second planar substrate and the edges cut out using a CNC mill. Then the first planar and second planar substrates are coupled and the electrospray tip is formed.

IV. Electrospray Integrated Electrodes

The present invention also features integrated electrodes for electrospray ionization, comprising conductive material deposited on a first planar substrate that is thereafter formed as the tip of an electrospray apparatus. The material may be patterned in particular arrangements on the first planar substrate before its formation as a tip.

FIGS. 6*a*-*q* show a number of patterns of conductive material 106 deposited on first planar substrates as integrated electrodes for electrospray tips. FIG. 6*h* illustrates the pattern shown in FIGS. 1 and 2, comprising two parallel traces that meet as the point of a V. FIGS. 6*i*-*k* illustrate other patterns of V-shapes, FIG. 61 illustrates a substantially U-like shape; FIG. 6*m* illustrates "pinched" U-shape; FIG. 6*n* illustrates a "pinched" V-shape; FIG. 6*o* illustrates a T-shape; FIG. 6*p* illustrates a Y-shape; and FIG. 6*q* illustrates a substantially linear shape. As explained above, the conductive material forms an integrated electrode to which contact can be made with an external wire, for example, to provide an electrospray voltage to the tip of the electrospray apparatus. Those of skill in the art can readily design additional patterns useful for patterning conductive material at an electrospray tip, using any known methods, for example any of the methods discussed in more detail below.

V. Manufacturing the Electrospray Apparatuses

Certain embodiments of the present invention feature methods of making an electrospray apparatus by depositing a conductive material onto a first planar substrate, thereafter forming the first planar substrate as an electrospray tip, and coupling it to the surface of a second planar substrate having one or more microfluidic channels and/or reservoirs. This forms an electrospray apparatus having an integrated electrode, as conductive material is deposited onto the first planar substrate before it is formed into the tip or coupled to the channel-bearing second planar substrate. First and second planar substrates can be separately manufactured in mass, with the first planar substrates featuring conductive regions and the second planar substrates featuring microfluidic channels and reservoirs. FIG. 7 illustrates the steps of an embodiment of the method, which will be described in further detail.

The first planar substrate may be composed of various materials known in the art, including glass, quartz, ceramic, silicon, silica, silicon dioxide or other suitable materials such as a polymer, copolymer elastomer or a variety of commonly used plastics. Examples of polymers include, but are not limited to, parylene C, poly (ethylene terephthalate) (PET), polyimide (PI), polycarbonate (PC), poly (dimethyl siloxane) or silicone elastomer (PDMS), silicone nitride, poly (methyl methacrylate) (PMMA), other acrylic-based polymers, Zeonor (a cyclic olefin polymer) (http://www.zeonchemical-.com/company/specialty.asp), other cyclic olefin polymers, poly(2-ethyl-2-oxazoline) (PEOX), polystyrene, polyester (Mylar®), photoresist, hydrogels, thermoplastics, and the like.

Figures 7A, 7B, 7C, 7D, 7E:
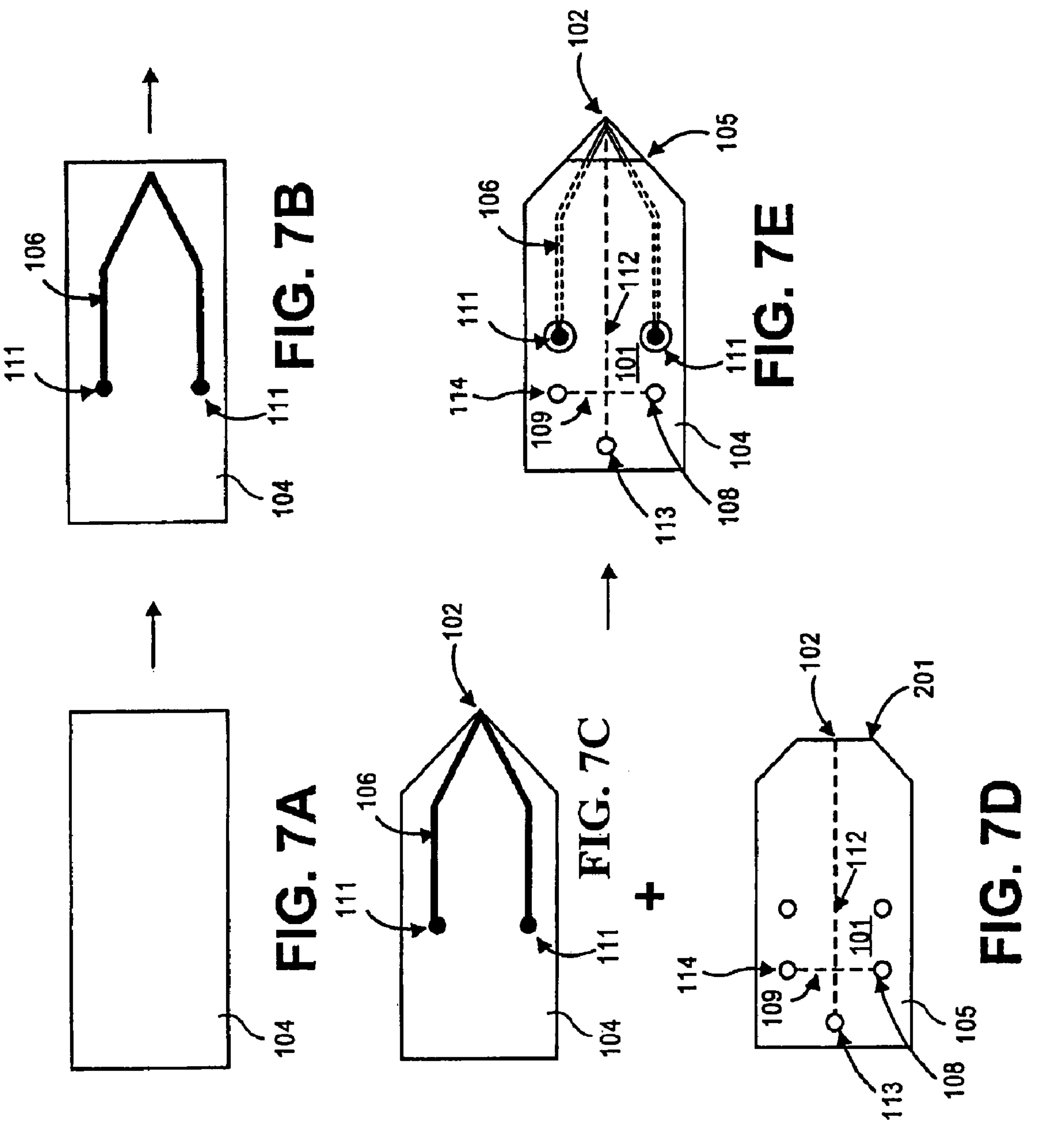
FIG. 7 shows a schematic for making one embodiment of a microfluidic electrospray apparatus comprising a tip with an integrated electrode.

FIG. 7*a* illustrates the first planar substrate 104 to be used. The films used are typically in the range of about 40 μm to about 150 μm thick, including about 45 μm, about 50 μm, about 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, and about 145 μm thick. Additionally, the film used may be about 20 μm, about 25 μm, about 30 μm, about 35 μm, as well as about 155 μm, about 160 μm, about 165 μm, and about 170 μm thick.

FIG. 7 illustrates conductive material 106 deposited on the first planar substrate 104 in a layer or trace. The conductive material may be graphite, a conductive ink, and/or a metal, such as gold, silver, chromium, copper, cobalt, aluminum, platinum, titanium, and the like. Gold, for example, adheres well to PMMA, polycarbonate, or Zeonor polymers, especially if the polymer is sputter-cleaned immediately before the deposition. FIG. 7*b* further shows contact points 111 where the conductive material is placed as a spot broader than the rest of the trace. Such points can facilitate contact with an external wire connected to an external electrode.

Generally, the conductive material can be deposited on the first planar substrate in any number of ways known in the art, including evaporation through a shadow mask, screen-printing, sputtering, dusting, including fairy dusting, and the like. Further, the conductive material can be patterned on the first planar substrate before it is formed as an electrospray tip. The conductive material can be deposited in a pattern on the first planar substrate using any known methods suitable for this procedure. Alternatively, the material can be patterned following its deposition onto the first planar substrate. Moreover, the conductive material may be deposited and/or arranged in any design or pattern suitable for its intended purpose in an electrospray apparatus, as FIGS. 6*a-q* illustrate (see above). Those of skill in the art can readily design additional patterns, using any known methods, for example any of the methods discussed in more detail below.

1. Evaporation using a Shadow Mask

Evaporation through a shadow mask can be used to deposit conductive material on a first planar substrate. A shadow mask design may be selected or ordered from mask vendors. The mask may be, for example, fabricated in a thin sheet of stainless steel, molybdenum, nickel, or a silicon wafer with multiple through holes, arranged in a pattern or design. The design can be chosen to deposit conductive material in a particular pattern on the first planar substrate. For example, the pattern can be specifically localized to the region of the film that will form the tip of a microfluidic electrospray apparatus. This avoids conductive material extending to other regions, for example, to regions of other contacts. If the conductive material extended to wells where different voltages are applied, for example, to effect a microfluidic separation, this could negatively impact the operation of the apparatus. Pre-selecting a shadow mask design, however, can avoid or reduce the extent of such problems.

The shadow mask can be aligned or otherwise positioned over the first planar substrate by any known, convenient method in a first step of this fabrication process. For example, the shadow mask can be mounted using an optical alignment tool, or mechanically positioned using a mechanical jig structure or etched pins and grooves. See, for example, Kim, G. et al. "Photoplastic shadow-masks for rapid resistless multi-layer micropatterning," from The 11$^{th}$ International Conference on Solid-State Sensors and Actuators, Munich, Germany, Jun. 10-14, 2001, available at http://www-mtl.mit.edu/research/mems-salon/valerie_micropatterning.pdf.

Conductive material can be placed on the shadow mask or in an evaporation source, and then evaporated through the openings of the mask onto the first planar substrate. The evaporation can be effected by any known means, for example, electron beam evaporation or evaporation employing a vacuum chamber. In this approach, using a vacuum allows less heat transfer. Further, the evaporation rate can be varied to obtain a desired rate of deposition, for example about 0.05 nm/min to about 3 nm/min or higher depending upon selected applications. Optionally, the process may be repeated with different conductive materials and/or different shadow mask designs to create what is known as multi-layered micropatterning. See, for example, Kim (2001) above. As explained above, the design of the shadow mask(s) used determines the pattern of the conductive material deposited on the first planar substrate.

2. Screen-Printing

Another technique for depositing conductive material onto first planar substrates involves screen-printing. Screen, or stencil-printing, as it is sometimes called, transfers a pattern by passing material through openings in a screen. In a typical screen-printing process, the pattern is transferred photographically to either a metal or polyester mesh (the screen), stretched on a frame. Conductive material is spread over the desired area and pushed through the screen, transferring the material to the desired surface.

A range of stencils and screens are available commercially, including, for example, emulsion screens, laser-cut stencils, mesh-mount stencils, and pump-print stencils, available, for example, from http://wwwdek.com/homepage.nsf/dek/stencils.htm. Again, the pattern can be chosen to deposit conductive material in a particular arrangement on the polymer film, possibly with a high degree of accuracy. Laser-cut stencils, for example, are cut with an accuracy of +/−5 μm, allowing precise control, for example, of how closely the conductive material will approach a region to be designated the edge of an ESI tip top be formed, and how far the conductive material will extend to other regions. Otherwise, extending conductive material to wells where separation voltages are to be applied, for example, could hurt the operation of an apparatus, as explained above.

3. Sputtering

Sputtering provides another method for depositing conductive material on a first planar substrate that can be used in certain embodiments of this invention. In this procedure, thermally emitted electrons collide with inert gas atoms, which ionize and accelerate toward a negatively-charged target that comprises the material to be deposited. As the ions impact the target, they dislodge atoms of the target material, which in turn are projected towards and deposited on a desired surface. See, for example, http://www.corrosion-source.com/handbook/glossary/sglos.htm. Properties of the deposited material depend on various parameters used during the sputtering process, including temperature, electron beam current, inert gas pressure, deposition rate, angle of incidence, voltage, and target-surface distance. Typical values for these parameters, include, for example, about 600 to about 650° C.; about 10 mA; about 10 mTorr argon pressure; about 1 nm/s deposition rate; normal to oblique incidence, about 1 kV, and target-to-surface distance of about 76 mm. For example, gold can be sputtered onto the first planar substrate, using a current of about 10 mA, a voltage of about 1.2 kV, and an argon pressure of about 0.1 mbar. While these are typical values, the sputter deposition process has many variations, allowing variation of these parameters for particular purposes. For example, in magnetron sputtering, the gas ions are confined by a magnetic field, increasing the ionization efficiency and permitting the use of lower voltages and lower temperatures. http://semiconductorglossary.com/default.asp?search/term=magnetron+sputtering/.

4. Evaporation and Electron Beam Evaporation

Another technique for depositing conductive material onto a first planar substrate is evaporation. This method is commonly used for thin film metal depositions and involves the heating of the material to be deposited in a vacuum at a $10^{-6}$ Torr-$10^{-7}$ Torr range, until it melts and starts evaporating. The vapor of the material condenses on the cooler substrate exposed to the vapor. However, this method is not suitable for high melting point materials. http://semiconductorglossary.com/default.asp?SearchedField=Yes&SearchTerm=evaporation. Electron beam (E-beam) evaporation is a variation in which material is evaporated through highly localized heating caused by bombardment with high energy electrons generated in an electron gun and directed toward the surface of a source material. The evaporated material is very pure but bombardment of a metal with electrons is accompanied by the generation of low intensity X-rays which may create defects in oxide present on surfaces of a substrate in general but these are not usually formed on polymer materials as there is usually no oxide present. http://semiconductorglossary.com/default.asp?searchterm=electron+beam+(e-beam)+evaporation. Evaporation techniques have the advantage of a lower heat transfer to the first and second planar substrates which can be particularly important for thermoplastic polymer applications applicable herein which generally have limited tolerance of high temperatures.

5. Dusting

Those of skill in the art will appreciate dusting as yet another technique for depositing a conductive material onto a first planar substrate. The method involves application of a layer of conductive material over an adhesive or wet layer, to secure the conductive material to the surface of the first planar substrate. For example, a thin layer of silicone glue can attach graphite particles, and other gluing media are appropriate for other conductive materials. See Nilsson, S. et al. "Rapid Commun. Mass Spectrom." 15:1997-2000 (2001). As with other deposition techniques, the conductive material can be dusted in a particular pattern on the first planar substrate, in accordance with its intended use as a microfluidic electrospray tip.

Several variations of dusting are known in the art. For example, fairy dusting involves using a glue to attach fine gold particles to surfaces. In particular, polyimide glue can attach 2 μm gold particles to silica surfaces. See Nilsson (2001) above.

It will be appreciated that these and other methods of depositing conductive material onto a first planar substrate allows for controlled deposition in a particular pattern. Moreover, separate first planar substrates with patterns of conductive material can be reproduced quickly and inexpensively by known methods, making the process amenable to large-scale production.

FIG. 7*c* illustrates how the first planar substrate 104 is formed as an electrospray tip 102. That is, after putting conductive material 106 on the film 104, the film may be micromachined in any number of ways to form an electrospray tip 102 for a microfluidic electrospray apparatus. For example, the film 104 may be cut, pinched, and/or folded, or otherwise shaped to form a tip-like structure 102. For cutting, a carbon dioxide laser cutting tool or other commercially available laser-cutting apparatus may be used. Other techniques include die cutting, trimming with an iris scissors (Roboz Surgical Instruments, Rockville, Md., USA) and/or a using scalpel blade under a stereomicroscope. Kim (2001) herein.

It will be appreciated that these first planar substrates can be cut in very rapid succession in a cost-effective manner, for example by a frequency-tripled YAG laser, avoiding photolithography and etching processes. Another cost-effective and rapid method to cut these first planar substrates is die-cutting. Thus, certain methods of the present invention lend themselves to rapid, large-scale production at relatively low cost.

FIG. 7*d* illustrates a second planar substrate 105 to which the micro-machined first planar substrate is coupled, to form an electrospray apparatus.

The first planar substrate and second planar substrate may be composed of various materials known in the art, including glass, quartz, ceramic, silicon, silica, silicon dioxide or other suitable materials such as a polymer, copolymer elastomer or a variety of commonly used plastics. Examples of polymers include, but are not limited to, parylene C, poly (ethylene terephthalate) (PET), polycarbonate (PC), poly (dimethyl siloxane) or silicone elastomer (PDMS), silicone nitride, poly (methyl methacrylate) (PMMA), other acrylic-based polymers, Zeonor (a cyclic olefin polymer) (http://www.zeonchemical.com/company/specialty.asp), other cyclic olefin polymers, polyimide (PI) (Kapton®), poly(2-ethyl-2-oxazoline) (PEOX), polystyrene (Mylar®), photoresist, hydrogels, thermoplastics, and the like.

The surface of the second planar substrate may feature one or more microfluidic channels 109, 112 and/or reservoirs 108, 113, 114 in fluid communication, with at least one dimension less than about 1 mm. The channels and reservoirs may be created using a variety of methods, such as photolithographically masked wet-etching and photolithographically masked plasma-etching, or other processing techniques such as embossing, molding, injection molding, casting, photoablating, micromachining, laser cutting, milling, and die cutting. In many cases, these processes begin by etching a master in a substrate material chosen to allow convenient and accurate microfabrication, such as a substrate mentioned above. For example, deep reactive ion etching (DRIE) of silicon substrates can yield good profiles. The master etched in this way can then either be directly replicated by the methods listed above, or a replica of the master may be made using an electroforming process, typically using nickel or a nickel alloy. The electroform can then be used to make the final patterned device in the material of choice, typically a polymeric material or certain glasses that can be embossed, molded or cast. The channels can have a variety of cross-sectional configurations, including for example having a substantially rectangular, trapezoidal, triangular, or D-shaped cross section. Further, reservoirs 108, 113, 114 can be made by drilling well holes in the substrate, for example, by using a conventional drill, in relation to respective embossed channels 109, 112.

It shall be understood that other method and variations of the preceding steps may be modified as known by those of ordinary skill in the art. For example, surfaces of the substrate may also be treated or chemically functionalized to affect the desired surface characteristics. These include, for example, covalently attaching desired functional groups to the silanol groups on glass substrates. The fluid channels may be further treated to improve performance characteristics. For example, the channels may be modified to provide a more hydrophilic surface that can improve the electrospray performance of microfluidic devices. During the manufacturing process, a series of one or more open channels may be coated by slowly introducing a coating solution flowing from within the chip outward. For example, a suitable coating such as polyvinyl alcohol can be applied to the channel surfaces and thermally immobilized to remain in place for a sufficient period of time. By treating the channel surfaces in this manner, it may be possible to minimize or reduce protein adsorption and to prevent the emitted solutions from spreading to undesired portions of the microfluidic device. A more stable and controlled electrospray may be thus provided.

FIG. 7*e* illustrates the first planar substrate 104 having conductive material 106 and coupled to a surface of the second planar substrate 105 to form a microfluidic device 101 with an electrospray tip 102. The first planar substrate 104 can be bonded, fixed, connected, and/or otherwise attached to the second planar substrate 105 by any known means in the microfabrication arts. Typically, the first planar substrate is coupled by a lamination process, where the film is adhered to a surface using the application of heat and pressure in an appropriate device, such as a laminator or a heated press. For example, Zeonor's thermal properties (e.g., glass transition temperature 105° C. for Zeonor 1020R) facilitate this bonding. Kameoka et al., "A Polymeric Microfluidic Chip for CE/MS Determination of Small Molecules," Anal. Chem., 2001, 73:1935-1941. Alternatively, adhesive bonding using a thin adhesive layer is also possible. Also, heat-activated adhesives may be used, for example, 25 µ thick silicone. Wen et al., "Microfabricated isoelectric focusing device for direct electrospray ionization-mass spectrometry," Electrophoresis 2000, 21:191-197. In a further bonding method, preferably for PDMS applications, a thin layer of methanol can be used between PDMS surfaces, which are then bonded by heating at 70° C. for 4 hours to evaporate the methanol. Because PDMS is a relatively tacky material that generally prevents sliding two of its surfaces relative to each order in order to align them, a liquid film of methanol or other suitable material can be utilized and applied between the two. Kim et al., "Microfabrication of polydimethylsiloxane electrospray ionization emitters" J. Chromatography A, 2001, 924(1-2):137-45. Further, one of skill in the art will appreciate that other lamination methods known in the art can be used to couple the first planar substrate 104 to the surface of a second planar substrate 105.

Another embodiment of the invention is thick-on-thick configuration where both the first planar substrate and second planar substrate have similar thicknesses.

Before coupling or attachment, the surfaces may be cleaned by detergent and rinsed with deionized water and dried with pressurized air. Oxygen plasma pretreatment may also be used. See, for example, Kim et al., "Microfabricated PDMS Multichannel Emitter for Electrospray Ionization Mass Spectrometry," J. of the Am. Society for Mass Spectrometry, 2001, 12(4):463-469. Further, in the case of a Zeonor first planar substrate, acetone can be used to clean this plastic with no dissolution of the Zeonor. Kameoka et al., "An Electrospray Ionization Source for Integration with Microfluidics," Anal. Chem, 2002, 74:5897-5901; Kameoka et al., (2001) above. Also, the first planar substrate and the second planar substrate surface may be aligned by any known method, for example, by the alignment methods described above. Additionally, a thin layer of methanol can be used between the surfaces to aid precise alignment, and then heated to evaporate the methanol. Kim et al. (2001) above. After alignment and attachment, any trapped bubbles can be removed by pressing between rollers.

FIG. 7*e* also illustrates how the shaped first planar substrate 104 is attached to the second planar substrate 105 so that its tapered tip extends beyond one edge of the second planar substrate 105, to help form the electrospray tip 102. The second planar substrate 105 may itself taper to a pointed tip. FIG. 7*e* illustrates how the first planar substrate 104 is placed over the tapered blunter tip of the second planar substrate 105, so that the film tip extends beyond the blunter tip to form a substantially-triangular tip 102. In this embodiment, one or more channels in the second planar substrate 105 that extend to its blunt tip form the spraying channel(s) 112 of the electrospray tip 102. Additionally, the part of the first planar substrate 104 extending beyond the edge of the second planar substrate 105 may be shaped or bent relative to the surface of the second planar substrate 105 to create, for example, different outer tip angles. In certain embodiments, the protruding tip 102 may serve as a nozzle or wick, preventing liquid from spreading laterally at the outlet 202 of the spraying channel 112. Kameoka et al., (2002) above.

It will be further appreciated that the first planar substrate surface having the conductive material deposited thereon may be oriented relative to the second planar substrate in at least two possible ways. The first planar substrate may be coupled to a surface of the second planar substrate so that the conductive material lies at least partly between the first planar substrate and the surface of the second planar substrate. As noted above, in this orientation, portions of the conductive material are sandwiched between the first planar substrate and the surface of the second planar substrate, protecting it from the environment, while only portions of the conductive material more proximal to the tip may be exposed.

Alternatively, the first planar substrate may be coupled so that the conductive material does not lie between the first planar substrate and the surface of the second planar substrate, but lies on the outside. In this orientation all or most of conductive material is exposed on one side. In the latter embodiments, the second planar substrate may itself taper to a pointed (rather than blunt) tip, so that the spraying channel or channels can end right at the tip outlet. Alternatively, the second planar substrate may extend beyond the first planar substrate as a pointed tip, creating open-ended and exposed spraying channel(s). Again, a variety of configurations may be selected for the tip region of the first planar and second planar substrates. The open-ended configuration provides certain advantages, including protecting the ESI-emitting structures from breakage. That is, as the tip of the first planar substrate can be recessed away from the edge, it can be much less susceptible to breakage or contamination.

Figures 8A, 8B, 8C, 8D, 8E, 8F, 8G, 8H, 8I, 8J, 8K, 8L, 8M, 8N, 8O, 8P, 8Q:
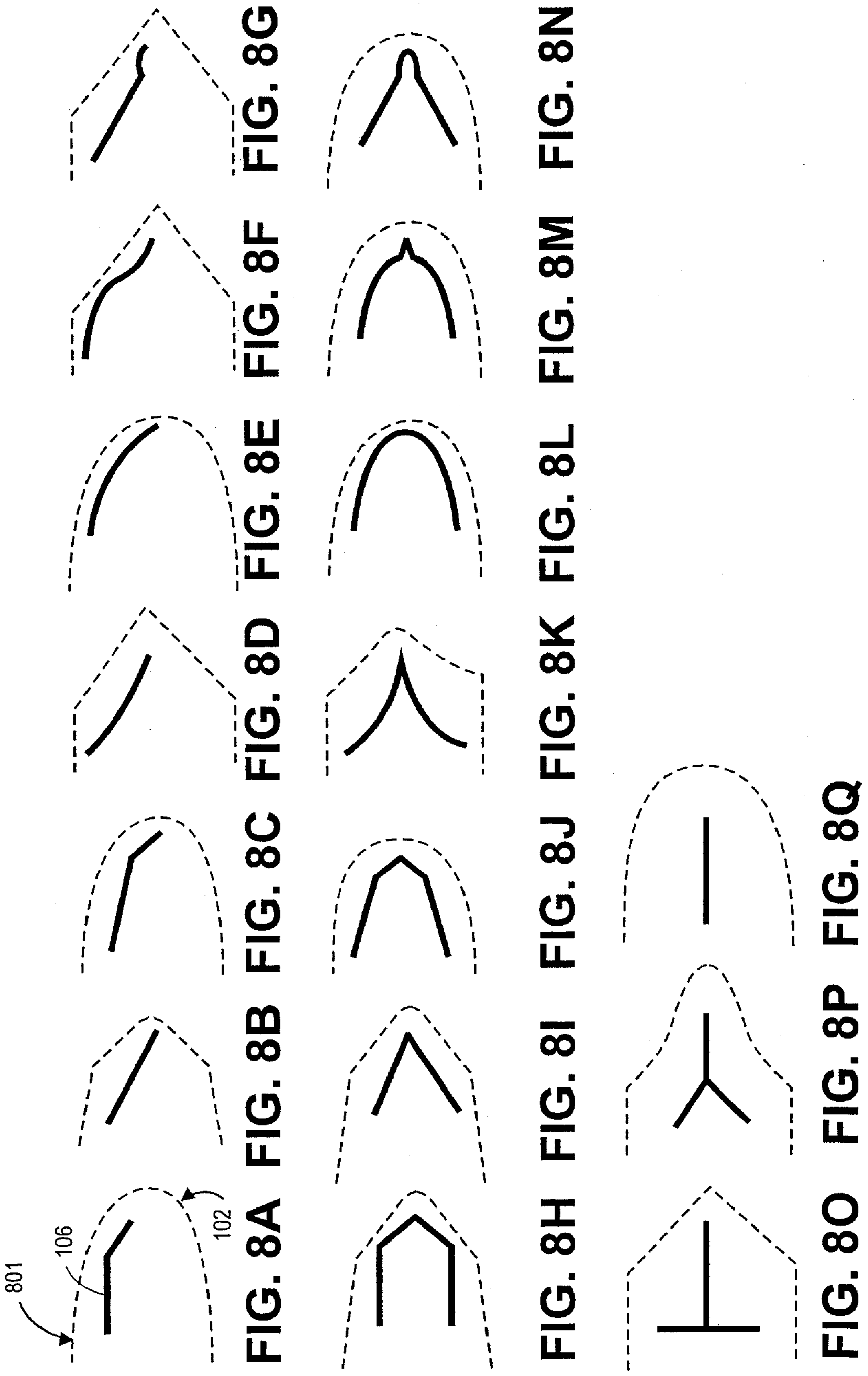
FIG. 8 shows paths along which substrates with patterned conductive material can be micro-machined.

FIGS. 8 illustrates a variety of configurations that may be selected for the tip region. Furthermore, it will be appreciated that the pattern of the deposited conductive material can serve as a guide for micro-machining the film. FIGS. 8*a-q* illustrate paths 601 along which first planar substrates with patterned conductive material 106 can be micro-machined. FIG. 8*h* shows that if the conductive material is deposited in a V-shape, the first planar substrates can be laser cut around this pattern to form a tapered tip 102 with a tapering trace of conductive material 106 reaching the tip. The angle at the tip 102 can be, for example, about 30°, about 45°, about 60°, FIGS. 8*i-k* illustrate other patterns of V-shapes. FIG. 8*l* illustrates a substantially U-like shape. FIG. 8*m* illustrates a "pinched" U-shape. FIG. 8*n* illustrates a "pinched V-shape. FIG. 8*o* illustrates a T-shape. FIG. 8*p* illustrates a Y-shape. FIG. 8*q* illustrates a substantially linear shape. The same can be done with other patterns, using any known, convenient method for micro-machining the first planar substrates.

It is to be understood that the above embodiments are illustrative and not restrictive. The scope of the invention should be determined with respect to the scope of the appended claims, along with their full scope of equivalents.

WORKING EXAMPLES

Example 1

Manufacture of an Electrospray Tip using Shadow-Mask Evaporation with Gold

A thin polymer of PMMA or cyclic olefin polymer (Zeonor 1020 R or Zeonor 1420) was used in this procedure. The PMMA film was Shinkolite HBS 007 (MT40, 40 μm thick, Mitsubishi Rayon Co., LTD) and Zeonor film was purchased from Zeon Chemicals with a thickness of ~100 μm. The film was sputter-cleaned or blown with N2 before the deposition procedure of evaporation through a shadow mask. The mask design was chosen to create a V-like pattern or a straight line at the end on the film. In this embodiment, gold metal was chosen as the conductive material, and evaporated through the openings of a stainless steel shadow mask onto the polymer film in the vacuum chamber. The thickness of deposited metal film was proportional to the time. The gold thickness was about 50 to about 300 nm, typically a thickness of 150 nm.

The film was then laser cut in alignment with the gold pattern deposited on it. That is, the laser was guided along the polymer film in a path around the lines of the V-like pattern. This formed a tapered tip with a tapering gold trace approaching the end of the tip. The film can be also be die cut or just cut with a razor blade, an Exacto knife, or scissors.

The cut film was then coupled to a surface of a second planar substrate. In this procedure, the polymer substrate used was about 1 mm thick, and featured a channel pattern embossed on the surface to be coupled to the film. The channel pattern consisted of two intersecting channels, with reservoirs at three ends of the channels. The device had been embossed, and then well openings were drilled through it, and the edges cut out, using a Computer-Numerically-Controlled mill (a CNC mill). The laser-cut film was bonded to the surface, so that the channels were enclosed by the film. One of the channels in the second planar substrate extended to one of its edges that tapered to form a blunt tip. The film was positioned on the surface of the substrate so that the tapered end of the V extended beyond this blunt tip edge, thereby forming an electrospray tip extending beyond its spraying channel. Further, the film was oriented so that the surface with the gold conductive material was sandwiched between the film and the surface of the substrate, except for gold deposited on the region of the tapered film extending beyond the substrate. The film tip can also be the same size as the tip on the substrate. In this case, the electrode was not sandwiched between the film and the substrate, but on the back of the film.

The film was bonded to the surface by a thermal lamination process. This lamination was carried out using a GBC Eagle 35 laminator in such a way that the temperature of upper and lower roller can be controlled separately. The film was aligned to the embossed surface, placed in a shim, and covered by a protection film. This assembly was then passed between the two heated rollers at a controlled speed. By choosing the space between the upper and lower rollers (pressure control), the lamination temperature, the roller speed, and thickness of shim and the protection film, the two surfaces were bonded together, while the gold pattern on the film remained intact, thereby forming an integrated electrode for contacting the electrospray tip of the apparatus.

Example 2

Manufacture of an Electrospray Tip using a Screen-Printing Procedure with Conductive Ink A thin polymer of PMMA or Zeonor (Zeonor 1020 R or Zeonor 1420, cyclo-olefin polymer) was used in this procedure. The PMMA film is Shinkolite HBS 007 (40 μm thick, Mitsubishi Rayon Co., LTD) and Zeonor film was purchased from Zeon Chemicals with a thickness of ~100 μm. A stencil for screen-printing was chosen to create a pinched V-like pattern, straight or curved line on the film. In the screen-printing process, the pattern was transferred to a polymer mesh secured on a frame. Conductive ink was then forced through the polyester mesh onto the surface of the polymer film, depositing the conductive material in the same V-like or simpler line pattern on the film. The conductive ink can be graphite ink, gold ink, platinum ink, silver ink, or silver/silver chloride ink. The screen printed ink then was cured at elevated temperature or room temperature before use.

The film was then laser cut in alignment with the ink pattern deposited on it. That is, the laser was guided along the polymer film in a path following the contours of the pinched V-like pattern. This formed a tapered tip with a corresponding trace of conductive ink following the perimeter of the tip and approaching the edge of the pinched tip.

The cut film was then coupled to a surface of a thick polymer substrate that is about 1.0 to 1.5 mm thick with a channel pattern embossed on the surface. The device had been made using a Computer-Numerically-Controlled mill (a CNC mill). The laser-cut film was bonded to the surface so that the channels were enclosed by the film. One of the channels extended to an edge of the second planar substrate that itself tapered to form a blunt tip. The film was positioned on the surface of the substrate so that the tapered end of the pinched V extended beyond this blunt tip edge, thereby forming an electrospray tip extending beyond its spraying channel. Further, the film was oriented so that the surface with the conducting ink faced away from the surface of the substrate, allowing the conducting material to be exposed on one side.

The film was bonded to the surface by a thermal lamination process. This lamination was carried out using a GBC Eagle 35 laminator in such a way that the temperature of upper and lower roller can be controlled separately. The film was aligned to the embossed surface, placed in a shim, and covered by a protection film. This assembly was then passed between the two heated rollers at a controlled speed. By choosing the space between the upper and lower rollers (pressure control), the lamination temperature, the roller speed, and thickness of shim and the protection film, the ink pattern on the polymer tip remained intact, thereby forming an integrated electrode for contacting the electrospray tip of the apparatus.

Example 3

Electrospray Apparatus with a V-Shaped Tip

FIG. 2 provides an example of an electrospray apparatus with an electrospray tip comprising a polymer film with conductive material. In this example, the film is PMMA and the conductive material is gold. The film (Shinkolite HBS 007 produced by Mitsubishi Rayon Co., LTD) had dimensions of 40 μm. The device contains microfluidic channels embossed in a relatively thick polymer substrate, about 1.5 mm thick, that tapers at one edge to form a blunt tip. The channels are enclosed with the polymer film, which extends as a tapered tip beyond the tapering edge of the second planar substrate, forming the electrospray tip. A channel extending to the same edge of the second planar substrate forms the spraying channel. The conductive material of the polymer film forms a V-shaped pattern that follows the perimeter of the tapered tip. It also extends beyond the blunt tip edge of the second planar substrate, to form an integrated electrode for the electrospray tip of the apparatus. Furthermore, in this example, the Gold film on the polymer film is sandwiched between the surface of the film and the surface of the second planar substrate, except for the material deposited on the region of the tapered film extending beyond the substrate edge.

Example 4

Second Electrospray Apparatus with a Pinched-V Tip

FIG. 3 provides a further example of an electrospray apparatus with an electrospray tip comprising a polymer film and a conductive layer. In this example, the film is PMMA and the conductive material is gold. The film (Shinkolite HBS 007 produced by Mitsubishi Rayon Co., LTD) had dimensions of 40 μm. The device contains microfluidic channels embossed in a relatively thick polymer substrate, about 1 mm thick. The electrospray tip is micromachined in the substrate and Computer-Numerically-Controlled (CNC) milled from the Z direction to form a freestanding tip. One channel extends to this tip edge of the second planar substrate to form a spraying channel. The channels are enclosed with the polymer film, which has the same shape as the substrate except at the very end of the spray tip where the substrate extends beyond the polymer film. The gold lies on the outside of the film, exposed on one side.

Example 5

Figure 9A:
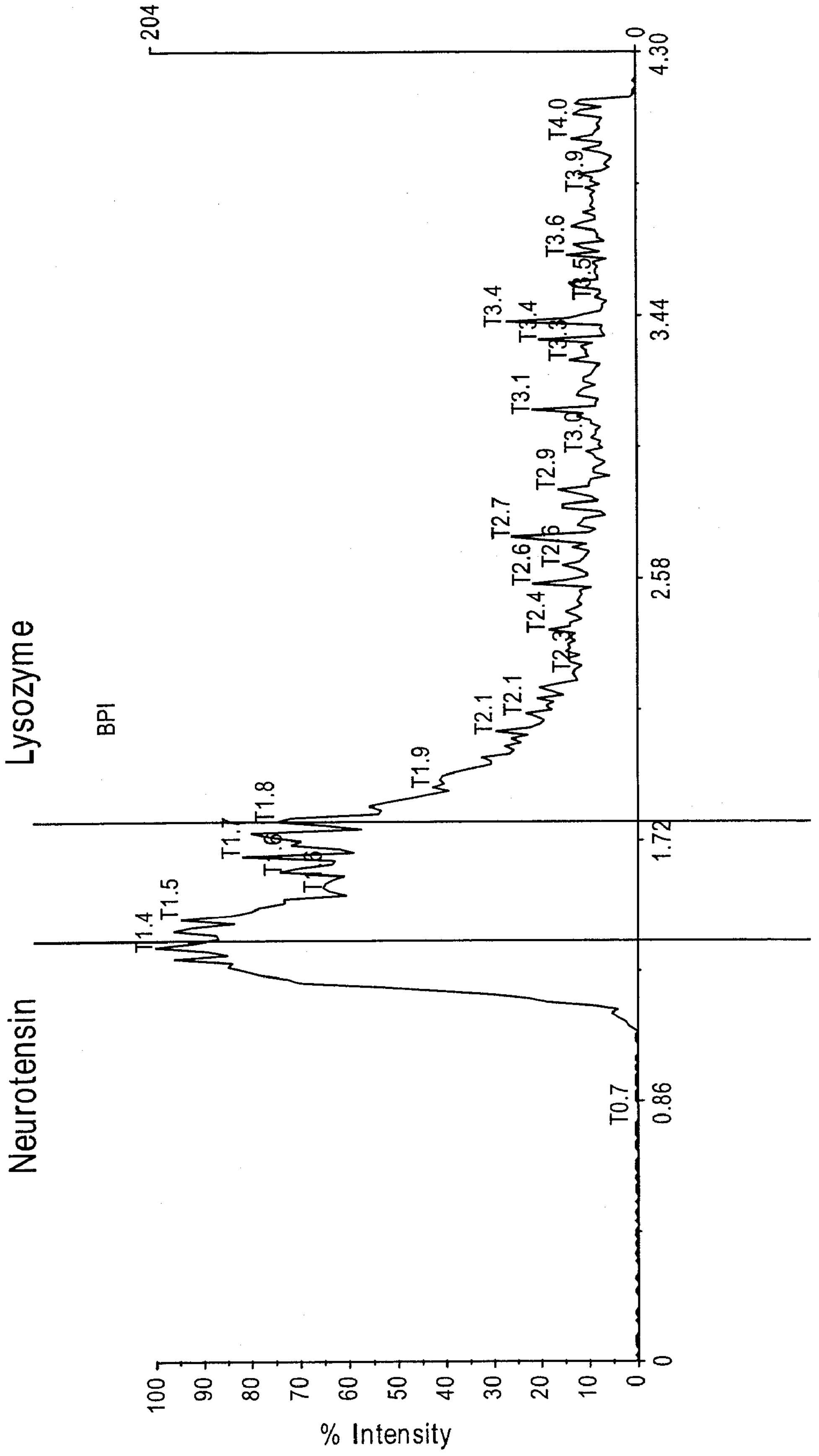
FIGS. 9*a-d* shows mass spectroscopy data from capillary electrophoresis, using a microfluidic electrospray apparatus according to the present invention.
Figure 9B:
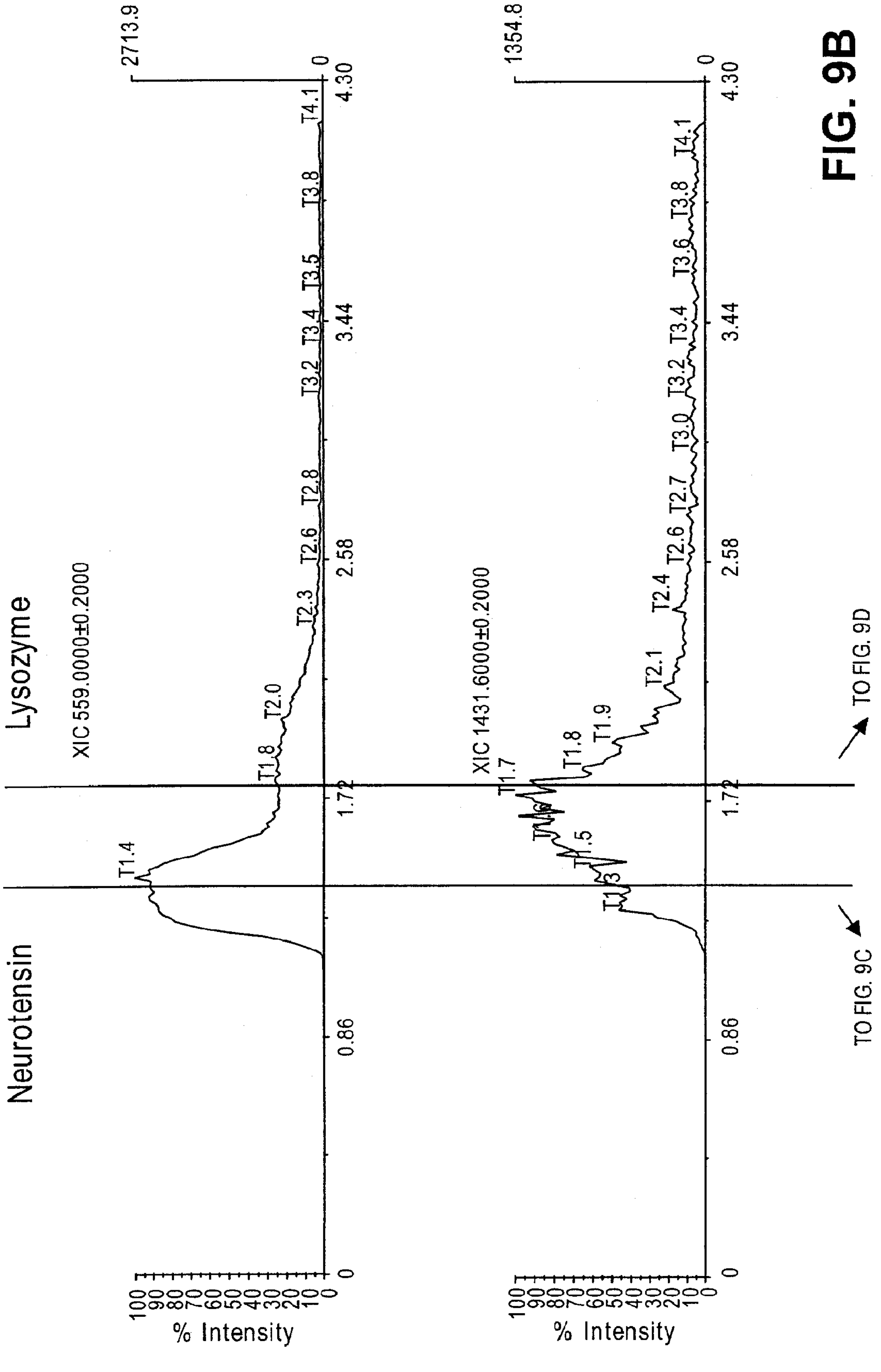

Capillary Electrophoresis-Mass Spectrometry Data, using an Electrospray Apparatus The operation of an electrospray apparatus of this invention was investigated in a capillary electrophoresis-mass spectrometry application, and using a set up similar to that illustrated in FIG. 1. This experiment involved the direct mass spectrometric detection of CE-separated components. Briefly, neurotensin and lysozyme mixtures were bought from Sigma. A solution of about 1 to 10 μM each of neurotensin and lysozyme in 10 to 30% IPA aqueous solution with 0.05 to 0.2% formic acid was placed in a sample reservoir of the microfluidic apparatus. The chip was coated with a coating such that the walls were positively charged, using the methods such as those described in pending application Ser. No. 10/681,742 Chapman et al., which is incorporated by reference herein in its entirety. Capillary electrophoresis was performed on the mixtures, by applying voltages across channels of the microfluidic device. Briefly, 1 to 2 kV was applied for 30 to 120 seconds at the sample waste reservoir while the sample reservoir was grounded, producing electrokinetic transfer of sample components through the intersection. After sample loading, sample and waste reservoirs were kept at about 1.4 kV, a voltage of about 1 kV was applied to the buffer reservoir and about 2.6 kV to the electrospray tip of the device to effect CE separation, as well as to drive the sample through the electrospray channel to undergo electrospray ionization, as described below. The total ion current in the mass spectrometer (ABI Mariner) was measured, to produce the electropherograms shown in FIGS. 9*a-b*. The neurotensin eluted first, followed by the lysozyme fraction.

The separated fractions were caused to emerge from the apparatus as an ionized electrospray. To accomplish this, a voltage source was connected to an external wire, which in turn made contact with the conductive material at the electrospray tip. A voltage was applied between the tip and the receiving orifice of the ABI Mariner time-of-flight mass spectrometer, setting up a potential difference between the solution at the tip of the spraying channel and the MS. The electric field between the tip and the external electrode generated the spray of highly-charged droplets as a thin jet at the tip of a Taylor cone. The charged droplets evaporated to leave ions representative of the species contained in the solution, including ions corresponding to the neurotensin and lysozyme proteins. In this experiment, an electric field sufficient for electrospray was obtained applying about 2600 V as the electrospray potential. A stable electrospray was obtained with flow rates in the range of 80 to 300 nL/min and the tip was aligned at a distance of 1 to 5 mm in front of the orifice of the MS. Further, the electrospray performance proved durable for at least about 10 minutes.

Figure 9C:
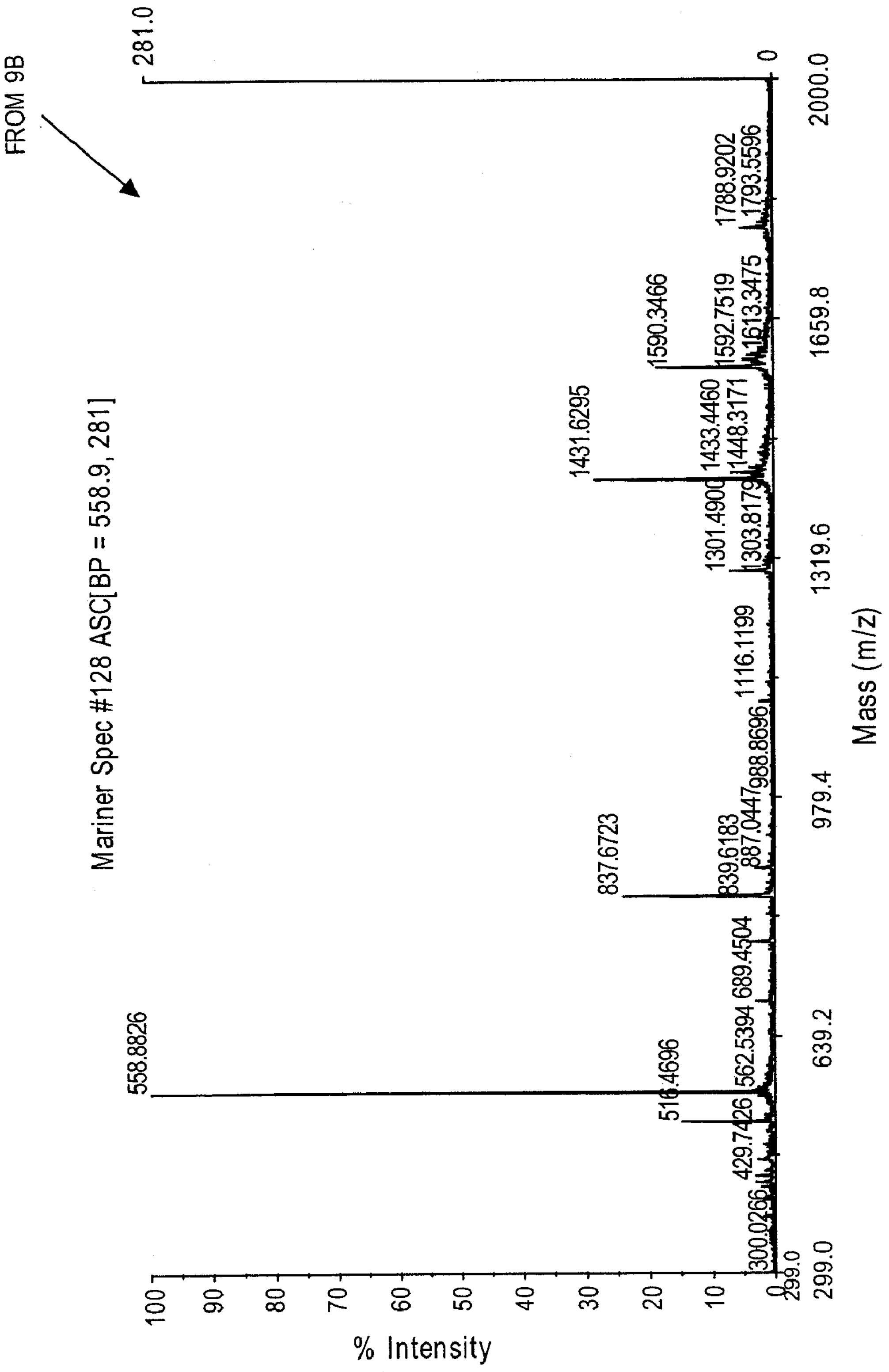
Figure 9D:
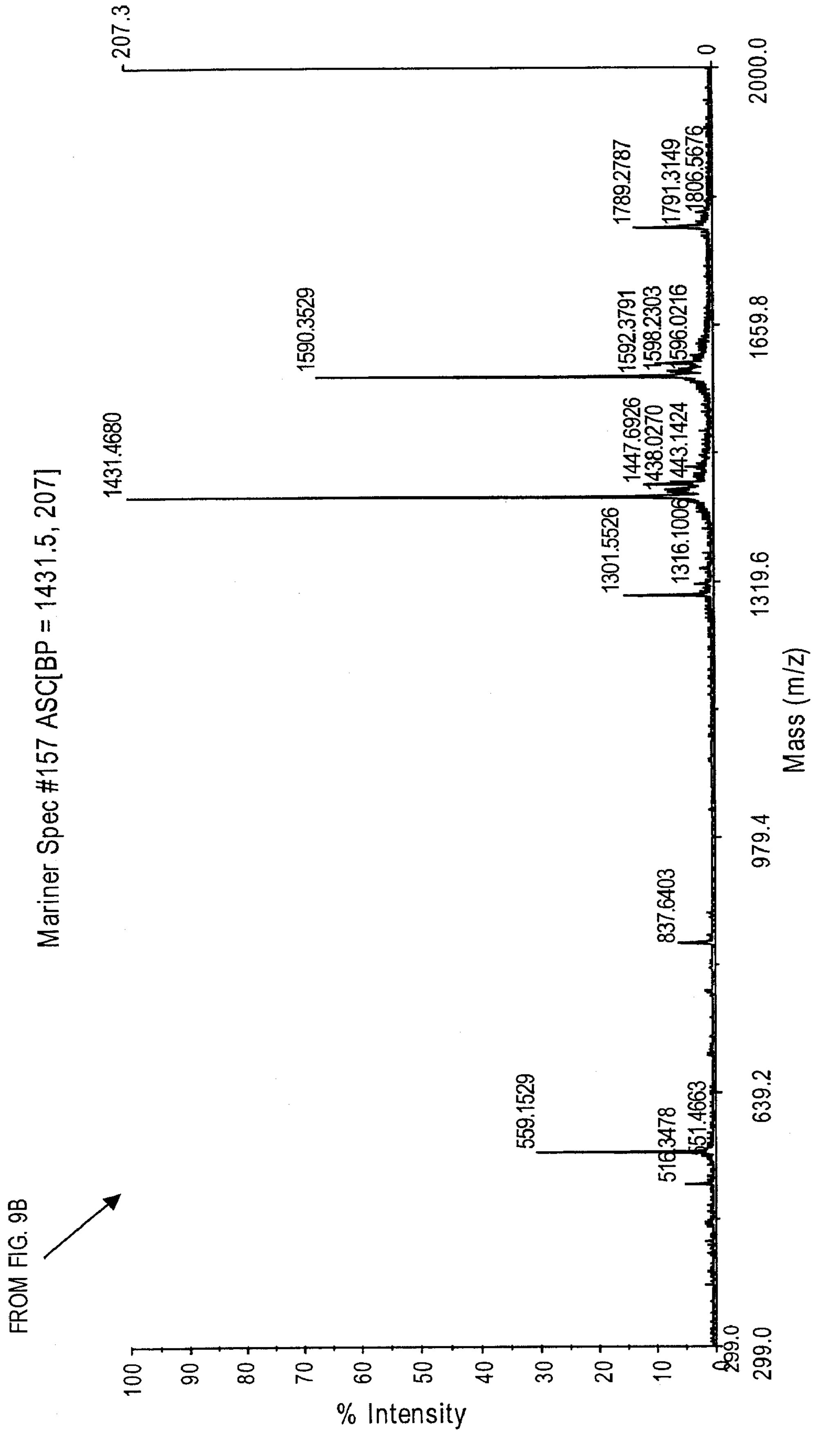

The ions were collected by the receiving orifice of the MS and resolved depending on their mass to charge ratios. The scan range of the mass-to-charge ratio (m/z) was from 300 to 2000. Software was used for collecting and evaluating the mass spectrometry data. FIGS. 9*c-d* shows the CE/MS mass spectra obtained with an acquisition time of 1 second per spectrum. The electrospray mass spectra show good resolution of signals and proper identification of the proteins using an embodiment of the present invention.

While certain embodiments of the present invention have been illustrated and described herein, it will be obvious to those skilled in the art that such embodiments are provided only by way of example. Numerous variations, changes, and substitutions will now occur to those skilled in the art without departing from the invention. It should be understood that various alterations to the embodiments of the invention described herein may be employed in practicing the invention. It is intended that the following claims define the scope of the invention and that methods and structures within the scope of these claims and their equivalents be covered thereby.

We claim:

1. An electrospray apparatus comprising:

a first planar substrate coupled to a second planar substrate to form at least one microfluidic channel that is at least partially enclosed, and wherein said first planar substrate includes a conductive region that does not intersect the microfluidic channel; and at least one of said first and second planar substrates tapers to form an edge-emitting electrospray tip.

2. The electrospray apparatus as recited in claim 1 wherein at least one of said first and second planar substrates contains another microfluidic channel and/or reservoir.

3. An electrospray apparatus comprising:

a first planar substrate coupled to a second planar substrate to form at least one microfluidic channel that is at least partially enclosed therebetween, and wherein said first planar substrate having a conductive region that includes a selected ionic conductor serving as an electrode which does not directly contact the microfluidic channel; and at least one of said first and second planar substrates tapers to form an edge-emitting electrospray tip.

4. The electrospray apparatus as recited in claim 3 wherein at least one of said first and second planar substrates contains another microfluidic channel and/or reservoir.

5. An electrospray apparatus comprising:

a first planar substrate coupled to a second planar substrate which forms at least a partially enclosed microfluidic channel, and wherein said first planar substrate contains an ionic conductor electrode that does not intersect any portion of the microfluidic channel; and at least one of said first and second planar substrates tapers to form an edge-emitting electrospray tip.

6. The electrospray apparatus as recited in claim 5 wherein at least one of said first and second planar substrates contains another microfluidic channel and/or reservoir.

* * * * *